US012153794B2

United States Patent
Akkapeddi et al.

(10) Patent No.: US 12,153,794 B2
(45) Date of Patent: Nov. 26, 2024

(54) AUTO-SEGMENTATION OF NON-FUNGIBLE TOKENS USING MACHINE LEARNING

(71) Applicant: Bank of America Corporation, Charlotte, NC (US)

(72) Inventors: Naga Vamsi Krishna Akkapeddi, Charlotte, NC (US); Siten Sanghvi, Westfield, NJ (US)

(73) Assignee: Bank of America Corporation, Charlotte, NC (US)

( * ) Notice: Subject to any disclaimer, the term of this patent is extended or adjusted under 35 U.S.C. 154(b) by 98 days.

(21) Appl. No.: 18/072,926

(22) Filed: Dec. 1, 2022

(65) Prior Publication Data
US 2024/0184859 A1    Jun. 6, 2024

(51) Int. Cl.
*G06F 3/06* (2006.01)
*G06F 21/10* (2013.01)

(52) U.S. Cl.
CPC ............ *G06F 3/06* (2013.01); *G06F 21/1014* (2023.08); *G06F 21/1015* (2023.08); *G06F 2221/2141* (2013.01); *G06F 2221/2145* (2013.01)

(58) Field of Classification Search
CPC .......... G06F 16/185; G06F 16/11–125; G06F 21/1014; G06F 21/1015; G06F 2221/2141; G06F 2221/2145; G06F 11/1446
See application file for complete search history.

(56) References Cited

U.S. PATENT DOCUMENTS

| | | | |
|---|---|---|---|
| 7,392,234 B2 * | 6/2008 | Shaath | G06F 16/125 |
| 8,990,191 B1 * | 3/2015 | Liu | G06F 16/951 |
| | | | 707/750 |
| 10,348,637 B1 | 7/2019 | McNair | |
| 10,536,445 B1 * | 1/2020 | Lerner | H04L 63/0428 |
| 11,075,891 B1 | 7/2021 | Long et al. | |
| 11,205,229 B1 * | 12/2021 | Todd | G06Q 40/06 |
| 11,423,169 B1 * | 8/2022 | Harold | G06F 21/6218 |
| 11,443,838 B1 * | 9/2022 | Cordonnier | G16H 10/60 |
| 11,494,760 B1 | 11/2022 | Khan | |
| 11,500,972 B2 | 11/2022 | Goldston et al. | |
| 11,513,677 B2 | 11/2022 | Chaudhri et al. | |
| 11,513,846 B1 | 11/2022 | Fletcher et al. | |
| 11,514,025 B2 | 11/2022 | Batchu | |

(Continued)

*Primary Examiner* — Steven S Kim
(74) *Attorney, Agent, or Firm* — Banner & Witcoff, Ltd.

(57) ABSTRACT

Aspects of the disclosure relate to an NFT segmentation platform. The NFT segmentation platform may train an auto-segmentation model to generate tier scores corresponding to non-fungible tokens (NFTs). The NFT segmentation platform may compare the tier scores to tier thresholds defining threshold ranges. The NFT segmentation platform may automatically store the NFTs based on storage rules corresponding to the threshold ranges. The NFT segmentation platform may modify the storage location of the NFT based on changes in the tier score. The NFT segmentation platform may train an NFT validation model to generate NFT validation ratings for NFTs. The NFT segmentation platform may compare the NFT validation ratings to threshold values to determine whether or not to execute an event processing request. The NFT segmentation platform may create an iterative feedback loops to update the auto-segmentation model and the NFT validation model.

20 Claims, 15 Drawing Sheets

(56) References Cited

U.S. PATENT DOCUMENTS

| | | | |
|---|---|---|---|
| 11,516,069 B1 | 11/2022 | Satish et al. | |
| 11,516,803 B2 | 11/2022 | Badic et al. | |
| 2004/0102980 A1* | 5/2004 | Reed | G06Q 30/02 705/1.1 |
| 2006/0010154 A1* | 1/2006 | Prahlad | G06F 3/065 707/999.102 |
| 2006/0074667 A1* | 4/2006 | Saffer | G10L 15/26 704/E15.044 |
| 2012/0226559 A1* | 9/2012 | Baum | G06Q 30/02 705/14.66 |
| 2020/0302506 A1* | 9/2020 | Parker | G06Q 30/0631 |
| 2021/0318803 A1* | 10/2021 | Zhu | H04L 67/1097 |
| 2021/0350442 A1 | 11/2021 | Amron | |
| 2022/0058635 A1 | 2/2022 | Yantis et al. | |
| 2022/0092153 A1 | 3/2022 | Cantrell et al. | |
| 2022/0138849 A1 | 5/2022 | Henson et al. | |
| 2022/0245659 A1* | 8/2022 | Zhang | G06N 3/04 |
| 2022/0294630 A1 | 9/2022 | Collen | |
| 2022/0309540 A1 | 9/2022 | Blaikie, III et al. | |
| 2022/0318233 A1 | 10/2022 | Martinez | |
| 2022/0318852 A1 | 10/2022 | Blaikie, III et al. | |
| 2022/0318853 A1 | 10/2022 | Blaikie, III et al. | |
| 2022/0343331 A1 | 10/2022 | Shannon, III et al. | |
| 2022/0366494 A1 | 11/2022 | Cella et al. | |
| 2022/0374503 A1 | 11/2022 | Goldston et al. | |

* cited by examiner

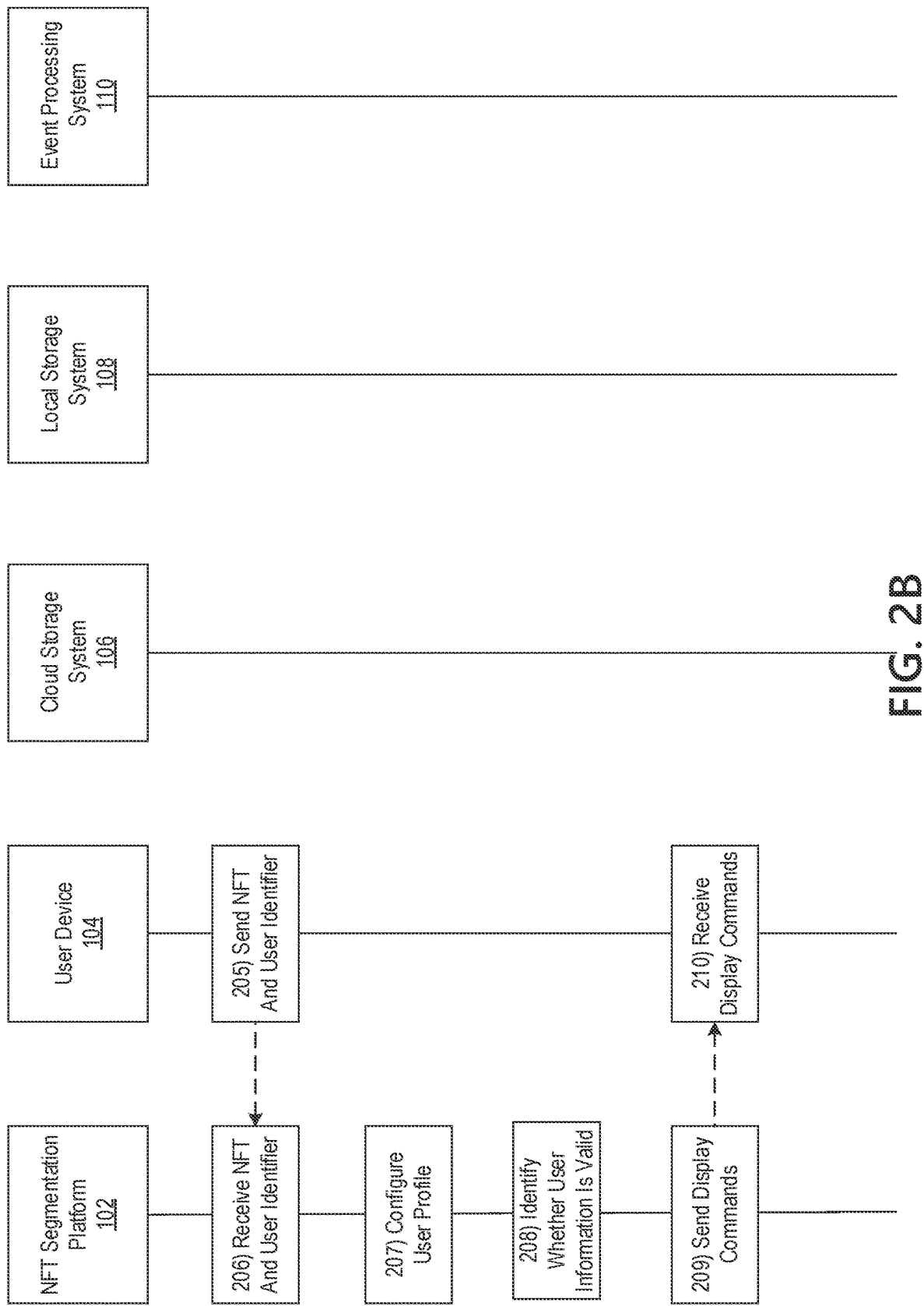

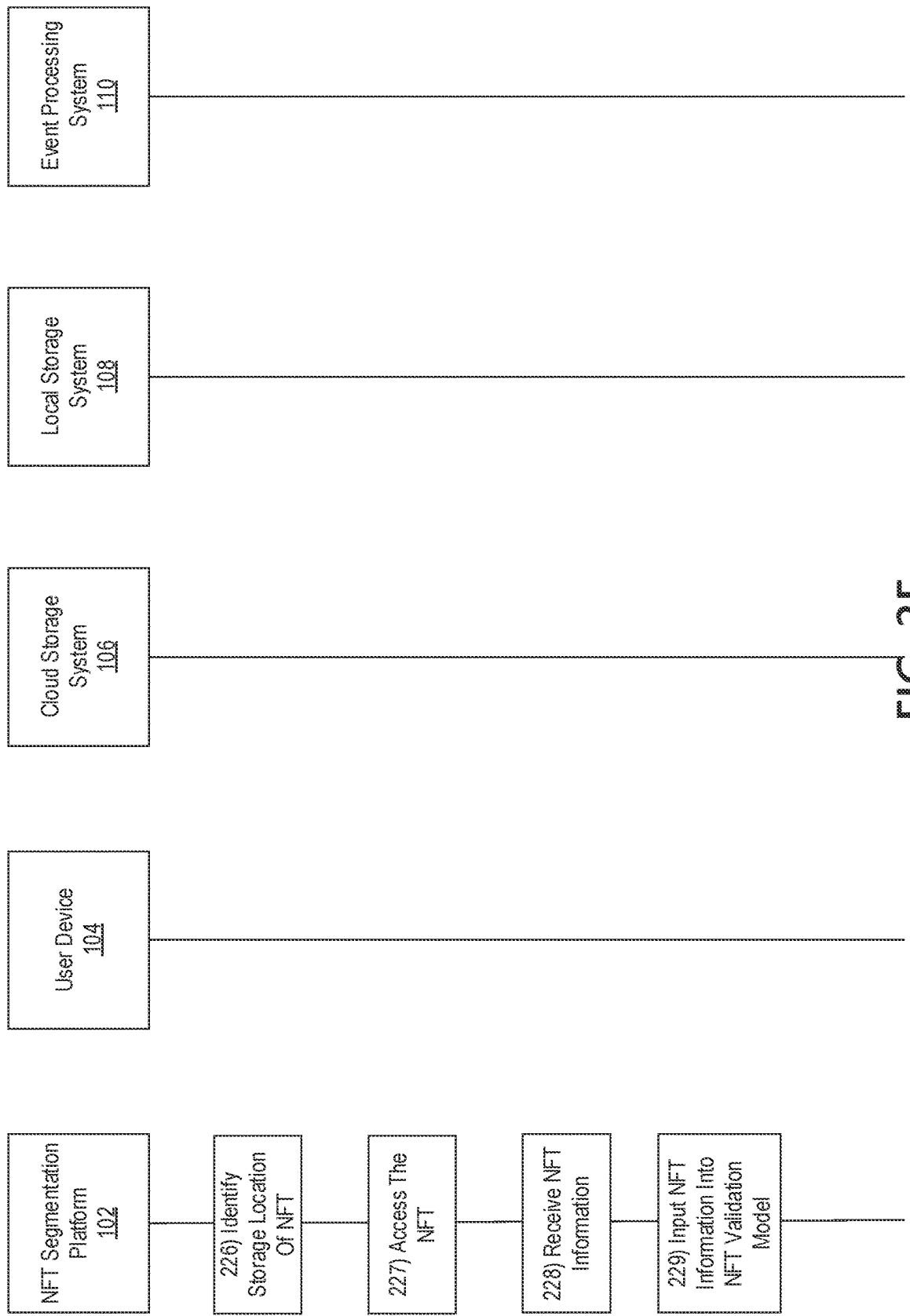

AUTO-SEGMENTATION OF NON-FUNGIBLE TOKENS USING MACHINE LEARNING

BACKGROUND

Aspects of the disclosure relate to storage of non-fungible tokens (NFTs). In some instances, one individual or multiple individuals may possess one NFT or multiple NFTs as digital resources. In some instances, these NFTs may be stored until a particular use case requires access to the NFTs. Based on the importance (e.g., the value, the frequency of use, and/or other factors) of the NFTs, some NFTs may require stronger security or more efficient storage and retrieval than others. Accordingly, it may be important to improve the efficiency of NFT storage. Additionally, over time the value and/or the ownership of the NFTs may shift, which may affect whether or not the NFTs may be used by the owner for a particular use case. It may also be important to identify methods for incorporating such changes into the NFT validation process.

SUMMARY

Aspects of the disclosure provide effective, efficient, scalable, and convenient technical solutions that address and overcome the technical problems associated with NFT segmentation and risk management. In accordance with one or more embodiments of the disclosure, a computing platform with at least one processor, a communication interface, and memory storing computer-readable instructions may train an auto-segmentation model based on historical non-fungible tokens (NFTs) and historical tier scores to output a plurality of tier scores corresponding to a plurality of NFTs, and indicating a plurality of storage locations for the plurality of NFTs. The computing platform may input the user information and a first NFT into the auto-segmentation model to generate a first tier score corresponding to the first NFT. The user information may comprise one or more of: account information, value of the first NFT, network conditions, geographical information, or ownership history. The computing platform may compare the first tier score to a tier threshold in order to identify storage rules. The storage rules may direct the computing platform to store the first NFT at a cloud computing platform based on identifying that the tier score meets or exceeds the tier threshold. The storage rules may further direct the computing platform to store the first NFT in local storage based on identifying that the first tier score is less than the tier threshold. The computing platform may modify a storage location of the first NFT based on detecting a change in the first tier score to a second tier score. Modifying the storage location of the first NFT may comprise comparing the second tier score to the tier threshold. Modifying the storage location of the first NFT may further comprise shifting the first NFT to the cloud computing platform, based on identifying that the second tier score meets or exceeds the tier threshold and previously was less than the tier threshold. Additionally or alternatively, modifying the storage location of the first NFT may comprise shifting the first NFT to the local storage, based on identifying that the second tier score is less than the tier threshold and previously met or exceeded the tier threshold. The computing platform may refine the auto-segmentation model based on the first tier score, the second tier score, and the first NFT.

In one or more instances, the computing platform may train an NFT validation model based on historical NFT information corresponding to the historical NFTs in order to output a plurality of NFT validation ratings corresponding to a plurality of NFTs. The computing platform may identify the storage location of the first NFT based on an event processing request and a user profile. The computing platform may access the first NFT from the storage location. The computing platform may receive NFT information corresponding to the first NFT. The computing platform may input the NFT information into the NFT validation model in order to generate an NFT validation rating based on the NFT information. The computing platform may identify whether or not the event processing request is valid. Identifying whether or not the event processing request is valid may comprise comparing the NFT validation rating to a threshold value. The computing platform may send the event processing request to an event processing system based on identifying that the event processing request is valid. The computing platform may refine the NFT validation model based on the NFT validation rating and the event processing request.

In one or more instances, the NFT information may comprise one or more of: account information, owner information, market value information user identifiers, social media information, authentication information, transaction history, or geographical information. In one or more examples, the historical NFT information may comprise one or more of: account information, event processing information, owner information, market value information, user identifiers, social media information, authentication information, transaction history, or geographical information. The historical NFT information may further comprise different historical tier scores corresponding to a single NFT, wherein the different historical tier scores correspond to one or more of: an event processing request, an owner of the single NFT, current value of the single NFT, or market value information. In one or more instances, identifying whether or not the event processing request is valid may further comprise executing an application programming interface call to retrieve social media information from a social media account, receiving the social media information from the social media account, updating the NFT validation rating based on the social media information, and comparing the updated NFT validation rating to a threshold value.

In one or more examples, the computing platform may send one or more commands to display a user interface to a user device, wherein the one or more commands to display the user interface cause the user device to display the user interface. The computing platform may request validation information corresponding to the event processing request via the user interface and based on identifying that the event processing request is invalid, from a user of the user device. In one or more instances, the NFT validation rating may comprise one or more of: a numerical value range, integer values, alphanumeric characters, percentage values, decimal values, hexadecimal values, or binary values. In one or more examples, identifying the location of the first NFT may comprise analyzing the event processing request to identify the first NFT, identifying a storage system where the first NFT is stored based on the storage rules, and accessing the storage system.

In one or more examples, the computing platform may modify a distributed NFT storage ledger to include a new element. The new element may be indicative of the first NFT. In one or more examples, the change in the first tier score may be based on one or more of: changed network conditions, changed value of the first NFT, changed NFT ownership, or changed market conditions.

In one or more instances, the computing platform may send one or more commands to display a user interface to a user device, based on identifying that the user information is invalid. In one or more examples, the computing platform may configure, based on the historical NFTs, a user profile. The computing platform may link the user profile to the first NFT. In one or more instances, the computing platform may identify whether or not user information is valid based on the user profile. The user profile may comprise the first NFT and a user identifier corresponding to the first NFT. In one or more examples, the user identifier may comprise one or more of: account information, digital keys, digital flags, or profile information. In one or more instances, the first NFT may comprise one or more of: digital signatures, digital assets, domain names, digital artwork, account information, transaction information, or digital currency.

In one or more examples, generating the first tier score may comprise the auto-segmentation model analyzing one or more of: user information, account information, identity providers (IdPs), transaction history, or profile information. In one or more instances, the storage rules may comprise one or more of: directions to access storage systems, storage capacity limits, or directions to store based on tier scores. In one or more examples, the first tier score may comprise one or more of: integer values, alphanumeric characters, percentage values, decimal values, hexadecimal values, or binary values.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for auto-segmentation of NFTs using a machine learning model in accordance with one or more example embodiments;

DETAILED DESCRIPTION

Figure 1A:
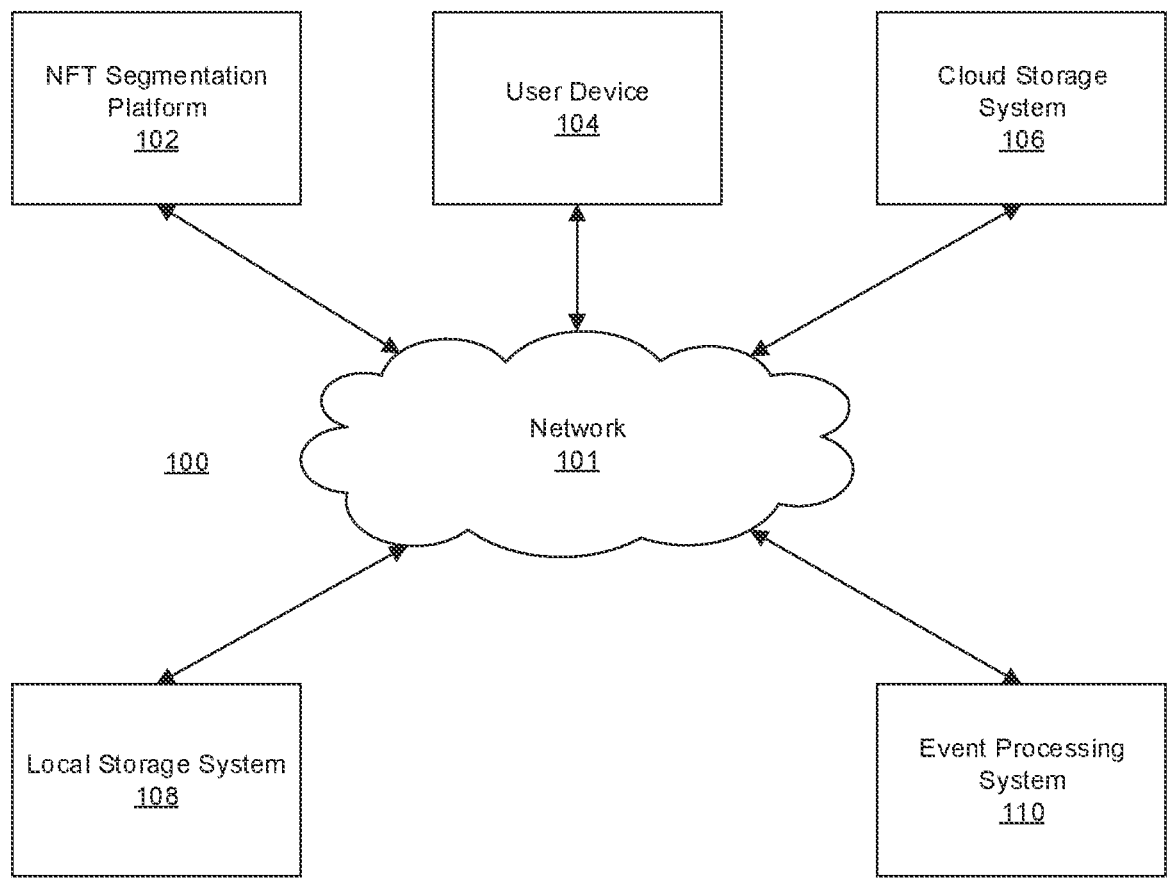
FIGS. 1A-1B depict an illustrative computing environment for auto-segmentation of NFTs using a machine learning model in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to a system for auto-segmentation of NFTs. Users of a service (e.g., one provided by a financial institution and/or other institutions) may require documentation in order to use the service. The service may require that the same documentation be presented repeatedly for separate use cases. In some instances, the users may own one or multiple NFTs containing the documentation. Presenting the same NFTs each time they are needed for separate use cases may reduce processing speeds (e.g., cause processing delays) for users of the service. Accordingly, a system may store an NFT after its first use to eliminate the need to re-send the NFT to the system during future uses. This storage may be provided by a service provider (e.g., a financial institution, and/or other institution).

In these instances, owners of one or multiple NFTs may require secure, efficient storage of their NFTs. The service provider may provide NFT storage to a multitude of clients who may have the ability to call for the provider's services (e.g., a central content repository that may be accessed by clients). Some clients may require improved security or more efficient retrieval of their stored NFTs. Accordingly, the NFTs may automatically be routed to a cloud storage system (e.g., a blockchain storage system). The cloud storage system may provide improved resiliency (e.g., superior electronic security, and/or other security improvements), easier retrieval of NFTs, and auto-validation of NFTs. However, storing some or all of the NFTs belonging to every user of a service may delay operations by requiring greater processing power. Accordingly, storage systems may generate tier scores corresponding to different need-based tiers (e.g., preferred client groups, long-time customer groups, account balance brackets, and/or other tiers). The storage systems may then route some NFTs to a different repository (e.g., a cloud-based storage system and/or a local storage system) based on the tier corresponding to their tier score. For example, an NFT with a tier score corresponding to "Tier 1" may be routed to a blockchain-based cloud repository that can offer better resiliency and maintain a sequence of the NFTs stored there in order to retrieve the NFTs more quickly. The storage system may use a machine learning model to identify the tier scores (e.g., by analyzing user information, account information, and/or other factors).

Additionally, service providers (e.g., financial institutions, or other institutions) may wish to maintain an NFT validation rating associated with any NFTs stored using their services. Owners of the NFTs may use them as a form of digital currency in order to execute certain events (e.g., complete a transaction using the NFT, and/or other events). However, the value of the NFT may fluctuate over time, so an NFT validation rating may be useful in determining the likelihood that the value of the NFT has dropped to the point it should not be used to execute a certain event. An NFT validation rating may also reflect the likelihood that someone is attempting to use an NFT without proper authorization (e.g., by using an NFT they do not own, by impersonating the owner of an NFT, by misrepresenting the value of an NFT, and/or by other methods). A risk management system may then be useful in maintaining NFT validation ratings for multiple NFTs owned by multiple individuals or groups. The system may use a machine learning model to identify NFT validation ratings based on NFT information (e.g., ownership information, account information, social media information, and/or other information). For example, the machine learning model may identify that an NFT should have a high NFT validation rating because the NFT was sent from a device corresponding to social media information that does not match the recorded ownership information of the NFT. The system may reject event processing requests involving the NFT based on the high NFT validation rating. The system may continue to train the machine learning model based on the NFT validation rating and the event processing request.

Figure 1B:
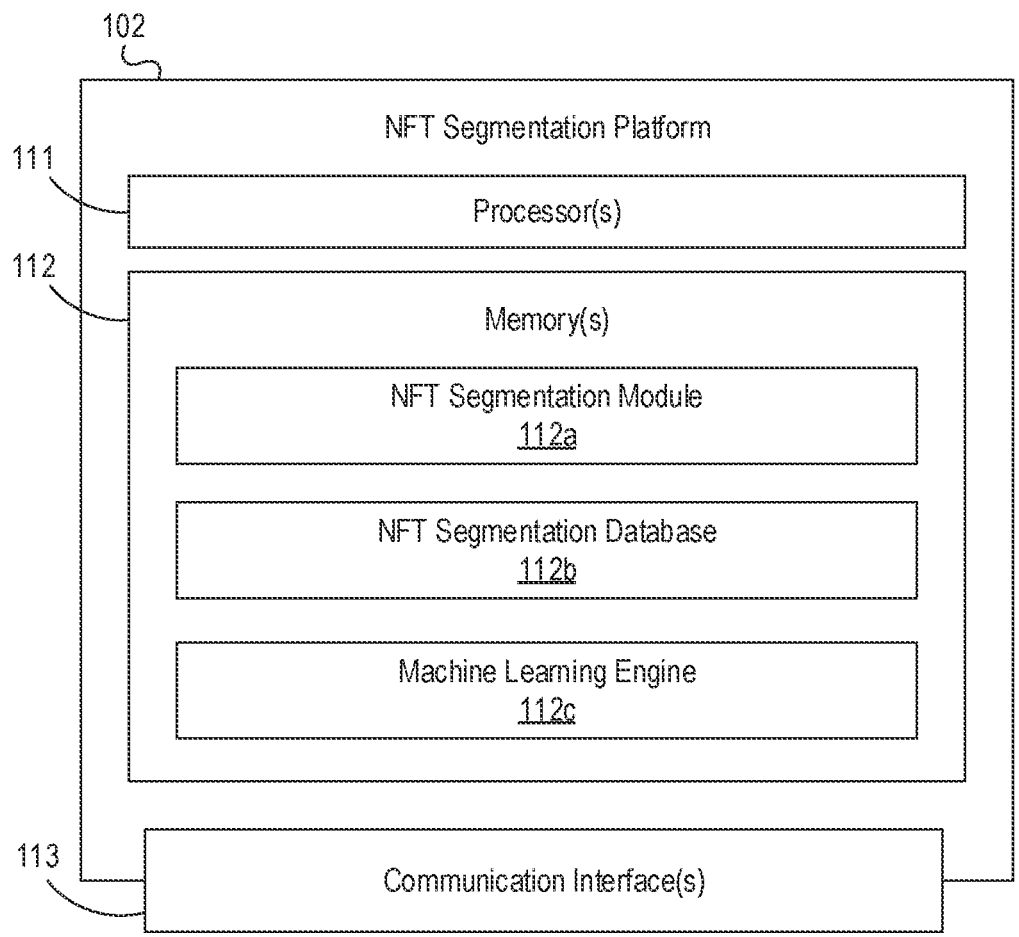

FIGS. 1A-1B depict an illustrative computing environment for auto-segmentation of NFTs using a machine learning model in accordance with one or more example embodiments. Referring to FIG. 1A, computing environment 100 may include one or more computer systems. For example, computing environment 100 may include an NFT segmentation platform 102, a user device 104, a cloud storage system 106, a local storage system 108, and an event processing system 110.

As described further below, NFT segmentation platform 102 may be a computer system that includes one or more computing devices (e.g., servers, server blades, or the like) and/or other computer components (e.g., processors, memories, communication interfaces) that may be used to configure, train and/or execute one or more machine learning models. For example, the NFT segmentation platform 102 may train the one or more machine learning models to generate a plurality of tier scores corresponding to a plurality of NFTs based on a plurality of user profiles. Additionally or alternatively, NFT segmentation platform 102 may train the one or more machine learning models to generate a plurality of NFT validation ratings corresponding to the plurality of NFTs based on NFT information. In some instances, NFT segmentation platform 102 may be controlled or otherwise maintained by an enterprise organization such as a financial institution. Although shown as an independent computing platform, in some instances, the NFT segmentation platform 102 may be part of and/or otherwise integrated into the cloud storage system 106 and/or local storage system 108 without departing from the scope of the disclosure.

User device 104 may be a computing device (e.g., laptop computer, desktop computer, mobile device, tablet, smartphone, server, server blade, and/or other device) and/or other data storing or computing component (e.g., processors, memories, communication interfaces, databases) that may be used to transfer data between users and/or perform other user functions (e.g., providing data for an event processing request, storing data, and/or other functions). In one or more instances, user device 104 may correspond to a first user (who may, e.g., be an employee or client of the enterprise organization such as a financial institution). In one or more instances, the user device 104 may be configured to communicate with one or more systems (e.g., NFT segmentation platform 102 and/or other systems) to perform a data transfer, request NFT storage, perform machine learning model configuration/training, and/or to perform other functions. In some instances, the user device 104 may be configured to display one or more graphical user interfaces (e.g., NFT ownership validity interfaces, user profile interfaces, NFT Risk Interface interfaces, and/or other interfaces).

Cloud storage system 106 may be and/or otherwise include one or more computing devices (e.g., servers, server blades, and/or other devices) and/or other computer components (e.g., processors, memories, communication interfaces) that may be used to create, host, modify, and/or otherwise validate a cloud-based storage system (e.g., a distributed ledger). The cloud storage system 106 may be synchronized across multiple nodes (e.g., sites, institutions, geographical locations, and/or other nodes) and may be accessible by multiple users (who may, e.g., be employees or clients of an enterprise organization such as a financial institutions). The data stored at the databases of cloud storage system 106 may include any of the data (e.g., NFT information, account information, and/or other information) stored at and/or created by user device 104 and/or any additional data. In some instances, the databases stored on cloud storage system 106 may be accessed by, validated by, and/or modified by any of, user device 104, NFT segmentation platform 102, and/or other devices. In some instances, one or more of the functions of NFT segmentation platform 102 may be performed at or by cloud storage system 106 instead. For example, cloud storage system 106 and NFT segmentation platform 102 may be and/or otherwise include the same computing device.

Local storage system 108 may be and/or otherwise include one or more computing devices (e.g., servers, server blades, and/or other devices) and/or other computer components (e.g., processors, memories, communication interfaces) that may be used to create, host, modify, and/or otherwise validate a local storage system (e.g., a hard drive). The data stored at the databases of local storage system 108 may include any of the data (e.g., NFT information, account information, and/or other information) stored at and/or created by user device 104 and/or any additional data. In some instances, the databases stored on local storage system 108 may be accessed by, validated by, and/or modified by any of, user device 104, NFT segmentation platform 102, and/or other devices.

Event processing system 110 may be one or more computer devices (e.g., servers, server blades, or the like) and/or other computer components (e.g., processors, memories, communication interfaces) that may be used to process event processing requests (e.g., transaction requests, NFT transfer requests, NFT withdrawal requests, payment processing requests, and/or other requests). In some instances, event processing system 110 may be configured to communicate with NFT segmentation platform 102 to receive and process event processing requests.

Computing environment 100 also may include one or more networks, which may interconnect NFT segmentation platform 102, user device 104, cloud storage system 106, local storage system 108, and event processing system 110. For example, computing environment 100 may include a network 101 (which may interconnect, e.g., NFT segmentation platform 102, user device 104, cloud storage system 106, local storage system 108, and event processing system 110).

In one or more arrangements, NFT segmentation platform 102, user device 104, cloud storage system 106, local storage system 108, and event processing system 110 may be any type of computing device capable of sending and/or receiving requests and processing the requests accordingly. For example, NFT segmentation platform 102, user device 104, cloud storage system 106, local storage system 108, and event processing system 110, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of NFT segmentation platform 102, user device 104, cloud storage system 106, local storage system 108, and event processing system 110, may, in some instances, be special-purpose computing devices configured to perform specific functions.

Referring to FIG. 1B, NFT segmentation platform 102 may include one or more processors 111, memory 112, and communication interface 113. A data bus may interconnect processor 111, memory 112, and communication interface 113. Communication interface 113 may be a network interface configured to support communication between NFT segmentation platform 102 and one or more networks (e.g., network 101, or the like). Communication interface 113 may be communicatively coupled to the processor 111. Memory 112 may include one or more program modules having instructions that, when executed by processor 111, cause NFT segmentation platform 102 to perform one or more functions described herein and/or one or more databases that may store and/or otherwise maintain information which may be used by such program modules and/or processor 111. In some instances, the one or more program modules and/or databases may be stored by and/or maintained in different memory units of NFT segmentation platform 102 and/or by different computing devices that may form and/or otherwise make up NFT segmentation platform 102. For example, memory 112 may have, host, store, and/or include NFT segmentation module 112a, NFT segmentation database 112b, and machine learning engine 112c.

NFT segmentation module 112a may have instructions that direct and/or cause NFT segmentation platform 102 to perform auto-segmentation of NFTs. NFT segmentation database 112b may have instructions causing NFT segmentation platform 102 to store NFTs, NFT information, and user profiles (that may, e.g., be used to perform auto-segmentation of NFTs). Machine learning engine 112c may contain instructions causing NFT segmentation platform 102 to train, implement, and/or update a machine learning model (that may, e.g., be used to perform auto-segmentation of NFTs). In some instances, machine learning engine 112c may be used by NFT segmentation platform 102 and/or NFT segmentation module 112a to refine and/or otherwise update methods for auto-segmentation of NFTs, and/or other methods described herein.

Figure 2A:
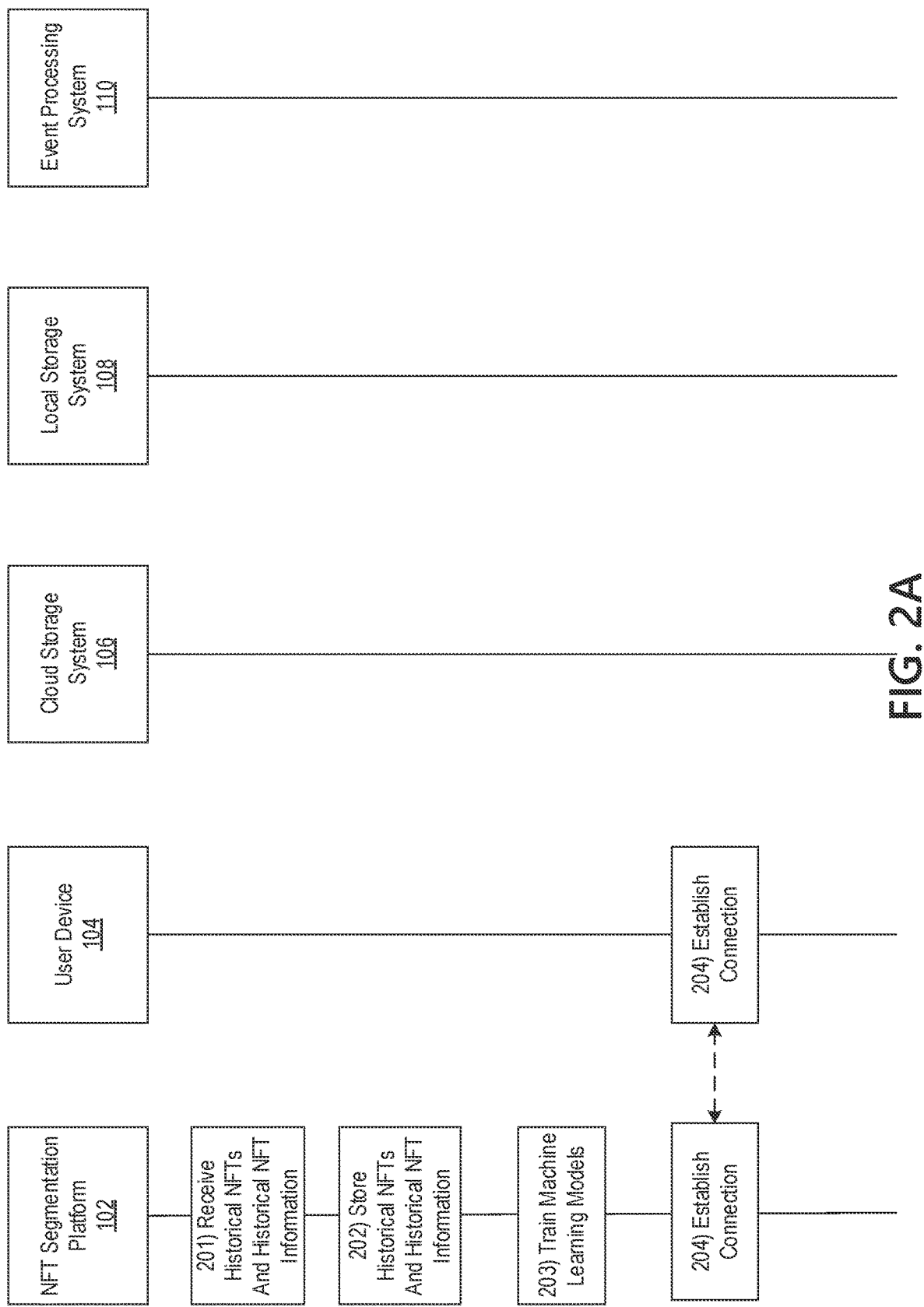

FIGS. 2A-2H depict an illustrative event sequence for auto-segmentation of NFTs using a machine learning model in accordance with one or more example embodiments. Referring to FIG. 2A, at step 201, NFT segmentation platform 102 may receive historical NFTs and corresponding historical NFT information. For example, NFT segmentation platform 102 may receive the historical NFTs and corresponding historical NFT information from a central repository (e.g., cloud storage system 106, local storage system 108, and/or other repositories). Additionally or alternatively, the NFT segmentation platform 102 may receive the historical NFTs and corresponding historical NFT information from a user device (e.g., user device 104, and/or other devices). The historical NFTs may be NFTs on which NFT segmentation platform 102 has previously performed auto-segmentation and/or risk management operations. The historical NFTs may also include historical tier scores (e.g., integer values, alphanumeric characters, percentage values, decimal values, hexadecimal values, binary values, and/or other representations of a score indicating a priority value of the corresponding historical NFT and/or a request corresponding to the historical NFT) generated when NFT segmentation platform 102 previously performed auto-segmentation operations on the historical NFTs. The historical NFT information may include one or more of: account information, user identifiers (e.g., a digital signature, and/or other identifiers), social media information (e.g., a profile hosted by a social media platform, and/or other information), authentication information (e.g., a password, and/or other information), transaction history (e.g., past payments, transfers, exchanges, and/or other events processed using the historical NFT), geographical information (e.g., a location corresponding to the digital address of the individual sending the historical NFT, and/or other information), and/or other information. In some instances, the historical NFT information may include different historical tier scores for a single NFT (e.g., the scores may vary based on a corresponding request, owner, current value, and/or otherwise).

At step 202, the NFT segmentation platform 102 may store the historical NFTs and the corresponding historical NFT information. For example, the NFT segmentation platform 102 may store the historical NFTs and the corresponding historical NFT information at a storage system (e.g., cloud storage system 106, local storage system 108, and/or other storage systems) for later use in training a machine learning model (e.g., the auto-segmentation model, the NFT validation model, and/or other machine learning models). Additionally or alternatively, the NFT segmentation platform 102 may store the historical NFTs and the corresponding historical NFT information in internal memory of NFT segmentation platform 102, and/or external memory.

At step 203, the NET segmentation platform 102 may train an auto-segmentation model in order to output a plurality of tier scores for a plurality of NFTs and indicating a plurality of storage locations for the plurality of NFTs. In some instances, the NFT segmentation platform 102 may configure and/or otherwise train the auto-segmentation model based on the historical NFTs and the historical tier scores. In some instances, to configure and/or otherwise train the auto-segmentation model, NFT segmentation platform 102 may process all (or a subset) of the historical NFTs and historical tier scores by applying natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering. K-means clustering, and/or other unsupervised techniques), and/or other techniques. In doing so, the NFT segmentation platform 102 may train the auto-segmentation model to identify, for a given NFT (e.g., a first NFT), a corresponding tier score.

For example, in configuring and/or otherwise training the auto-segmentation model, NFT segmentation platform 102 may input historical NFTs that NFT segmentation platform 102 has previously performed auto-segmentation and/or risk management operations on, and historical tier scores generated while performing those operations, into the auto-segmentation model. For instance, the NFT segmentation platform 102 may identify that a historical NFT sent by a particular user to the NFT segmentation platform 102 for auto-segmentation received a particular tier score based on the user's account information. The NFT segmentation platform 102 may train the auto-segmentation model to generate the same tier score for NFTs that correspond to the same user's account information (e.g., by storing a correlation between the user's account information and the tier score). Additionally or alternatively, the NFT segmentation platform 102 may mine the historical NFTs to determine common tier scores for particular NFTs. For example, based on the historical NFTs and historical tier scores the NFT segmentation platform 102 may identify that all NFTs with an approximate monetary value greater than a threshold value correspond to a particular tier score. In another instance, the NFT segmentation platform 102 may identify a particular tier score corresponding to similarly situated users. For example, the NFT segmentation platform 102 may identify that a particular tier score corresponds to a common trait shared by a group of users (e.g., geographic location, shared demographic information, shared account information, and/or other traits). In these instances, the NFT segmentation platform 102 may use the auto-segmentation model to generate the particular tier score for an NFT (e.g., as described further below with regard to step 212).

In some instances, the NFT segmentation platform 102 may also train an NFT validation model in order to output a plurality of NFT validation ratings for the plurality of NFTs. In some examples, the NFT segmentation platform 102 may configure and/or otherwise train the NFT validation model based on the historical NFT information. In some instances, the historical NFT information may include historical NFT validation ratings. In some examples, to configure and/or otherwise train the NFT validation model, NFT segmentation platform 102 may process all (or a subset) of the historical NFT information using supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), and/or other techniques. In doing so, the NFT segmentation platform 102 may train the NFT validation model to generate and store, for a given NFT (e.g., the first NFT), an NFT validation rating.

For example, in configuring and/or otherwise training the NFT validation model, NFT segmentation platform 102 may apply natural language processing to historical NFT information and historical NFT validation ratings the NFT segmentation platform 102 has previously performed risk management operations on. For instance, the NFT segmentation platform 102 may identify that historical NFT information (e.g., a twenty percent decrease in the market value of an NFT) caused NFT segmentation platform 102 to decrease a corresponding historical NFT validation rating (e.g., by twenty percent). Accordingly, the NFT segmentation platform 102 may train the NFT validation model to decrease the NFT validation rating by twenty percent if the market value for an NFT decreases by twenty percent.

In some instances, the NFT segmentation platform 102 may train the NFT validation model to generate NFT validation ratings based on the likelihood of accurate ownership of the NFT. For example, the historical NFT information may include account information corresponding to an original owner of an NFT. The NFT segmentation platform 102 may train the NFT validation model to increase the NFT validation rating corresponding to the NFT based on identifying that the NFT no longer corresponds to the original owner.

In some instances, the auto-segmentation model and the NFT validation model may be separate and distinct from each other. In these instances, the models may undergo separate training and may, in some instances, be models (or combinations of models) of the same or different types. In other instances, a single model may be trained to perform the functions described above with regard to both models.

At step 204, user device 104 may establish a connection with NFT segmentation platform 102. For example, user device 104 may establish a first wireless data connection with the NFT segmentation platform 102 to link the NFT segmentation platform 102 with the user device 104 (e.g., in preparation for sending an NFT). In some instances, the user device 104 may identify whether or not a connection is already established with the NFT segmentation platform 102. If a connection is already established with the NFT segmentation platform 102, the user device 104 might not re-establish the connection. If a connection is not yet established with the NFT segmentation platform 102, the user device 104 may establish the first wireless data connection as described above.

Referring to FIG. 2B, at step 205, once a connection has been established, the user device 104 may send an NFT (e.g., the first NFT, which may, e.g., be a digital signature, domain name, digital artwork, account information, transaction information, digital currency, and/or other digital assets) and a user identifier (e.g., account information, digital keys, digital flags, profile information, and/or other identifiers) to the NFT segmentation platform 102. For example, the user device 104 may send the NFT and user identifier via the communication interface 113 and while the first wireless data connection is established. In some instances, the user identifier may be linked to the NFT (e.g., as a digital signature included in the NFT). It is noted that in some instances the user device 104 may send more than one NFT and user identifier.

At step 206, NFT segmentation platform 102 may receive the NFT and the user identifier from the user device 104. For example, the NFT segmentation platform 102 may receive the NFT and he user identifier via the communication interface 113 and while the first wireless data connection is established.

At step 207, the NFT segmentation platform 102 may configure a user profile. The NFT segmentation platform 102 may configure the user profile based on the historical NFTs. For example, the NFT segmentation platform 102 may configure the user profile to maintain a record of all the NFTs NFT segmentation platform 102 has received from a particular source (e.g., user device 104, other user devices, and/or other sources). In configuring the user profile, the NFT segmentation platform 102 may maintain NFT information corresponding to the NFTs in the user profile. For example, the NFT segmentation platform 102 may maintain user information, account information, authentication information, transaction history, geographical information, user identifiers, NFT identifiers, and/or other NFT information. In some instances, the user profile may be linked to the NFTs via one or more user identifiers. For example, each NFT may include a digital signature that corresponds to the user. The NFT segmentation platform 102 may configure the user profile to include the NFT received at step 206.

At step 208, the NFT segmentation platform 102 may identify whether or not user information is valid. The user information may include the NFT and the user identifier received at step 206. In identifying whether or not the user information is valid, the NFT segmentation platform 102 may compare the NFT and the user identifier to the user profile to determine whether the owner of user device 104 should possess the NFT. For example, the NFT segmentation platform 102 may identify whether the user identifier received at step 206 matches a user identifier in records maintained at the user profile, a distributed ledger corresponding to the NFT, and/or other source of truth. Based on identifying a match, the NFT segmentation platform 102 may determine that the owner of user device 104 owns the NFT. In these instances, the NFT segmentation platform 102 may identify that the user information is valid. In some examples, based on identifying that the user information is valid, the NFT segmentation platform 102 may input the NFT into the auto-segmentation model without sending display commands to the user device 104 (e.g., as described below at step 211). In some instances, based on failing to identify that the user information is valid, the NFT segmentation platform 102 may send one or more display commands to the user device 104 (e.g., as described below at step 209).

At step 209, based on failing to identify that the user information was valid, the NFT segmentation platform 102 may send one or more commands directing the user device 104 to display a user interface. For example, the NFT segmentation platform 102 may send the one or more commands directing the user device 104 to display the user interface via the communication interface 113 and while the first wireless data connection is established.

At step 210, the user device 104 may receive the one or more commands directing the user device 104 to display the user interface from NFT segmentation platform 102. For example, the user device 104 may receive the one or more commands directing the user device 104 to display the user interface via the communication interface 113 and while the first wireless data connection is established. Based on or in response to the one or more commands to display the user interface, the user device 104 may display a validity interface. In some instances, the validity interface may be configured to receive user input through the user device 104.

Figure 3A:
FIGS. 3A-3C depict illustrative graphical user interfaces depicting auto-segmentation of NFTs using a machine learning model in accordance with one or more example embodiments.

For example, in displaying a validity interface, the user device 104 may display a graphical user interface similar to NFT ownership validity interface 300, which is illustrated in FIG. 3A. Referring to FIG. 3A, in some instances, the NFT ownership validity interface 300 may include information corresponding to the user information. For example, the NFT ownership validity interface 300 may include information such as the result of NFT segmentation platform 102 identifying whether or not the user information was valid, an identifier for the NFT, the cause of the failure to identify that the user information was valid, and/or other information. The NFT ownership validity interface 300 may also display input mechanisms or selectable options requesting user input. For example, the NFT ownership validity interface 300 may display one or more of: a button or buttons, toggle or toggles, check box or boxes, and/or other interface elements. For example, as illustrated in FIG. 3A, the input mechanisms may be buttons the user can select to decide whether or not to retry a validity check. In some instances, based on user input directing the user device 104 to retry the validity check, the user device 104 may send one or more commands directing the NFT segmentation platform to identify whether or not the user information is valid again (e.g., as described above at step 208).

Figure 3B:
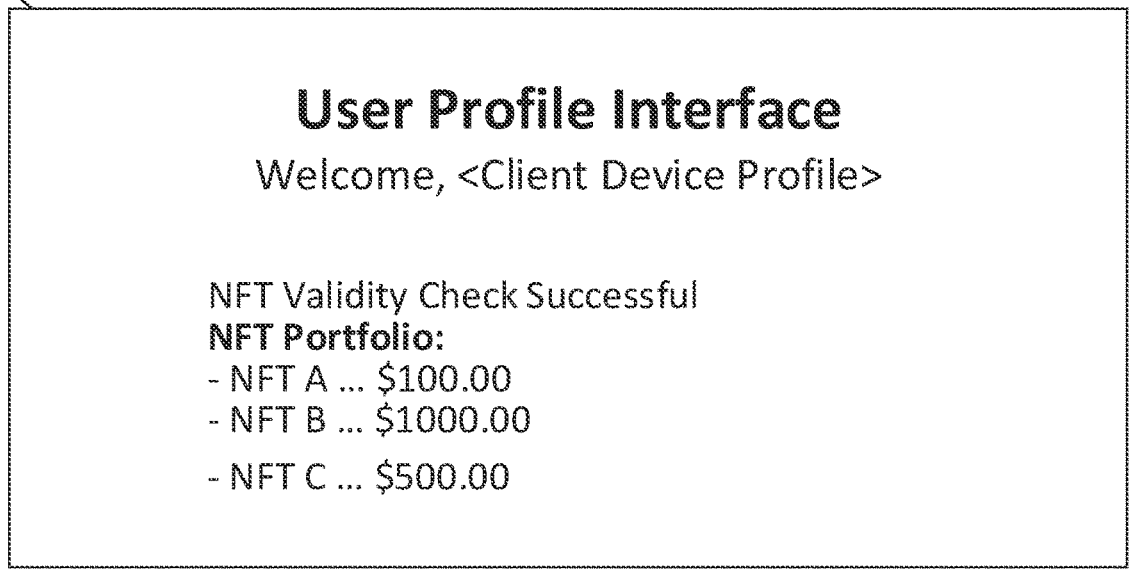

Additionally or alternatively, based on or in response to the one or more commands to display the user interface, the user device 104 may display a user profile interface. For example, in displaying a user profile interface, the user device 104 may display a graphical user interface similar to user profile interface 310, which is illustrated in FIG. 3B. Referring to FIG. 3B, in some instances, the user profile interface 310 may include information corresponding to the user profile. For example, the user profile interface 310 may include information such as a user identifier and/or user device identifier, the result of NFT segmentation platform 102 identifying whether or not the user information was valid, an NFT portfolio displaying information corresponding to the user's NFTs (e.g., a list of the historical NFTs corresponding to the user that NFT segmentation platform 102 previously performed auto-segmentation operations on), the value or values of the NFTs in the NFT portfolio, and/or other information.

Figure 2C:
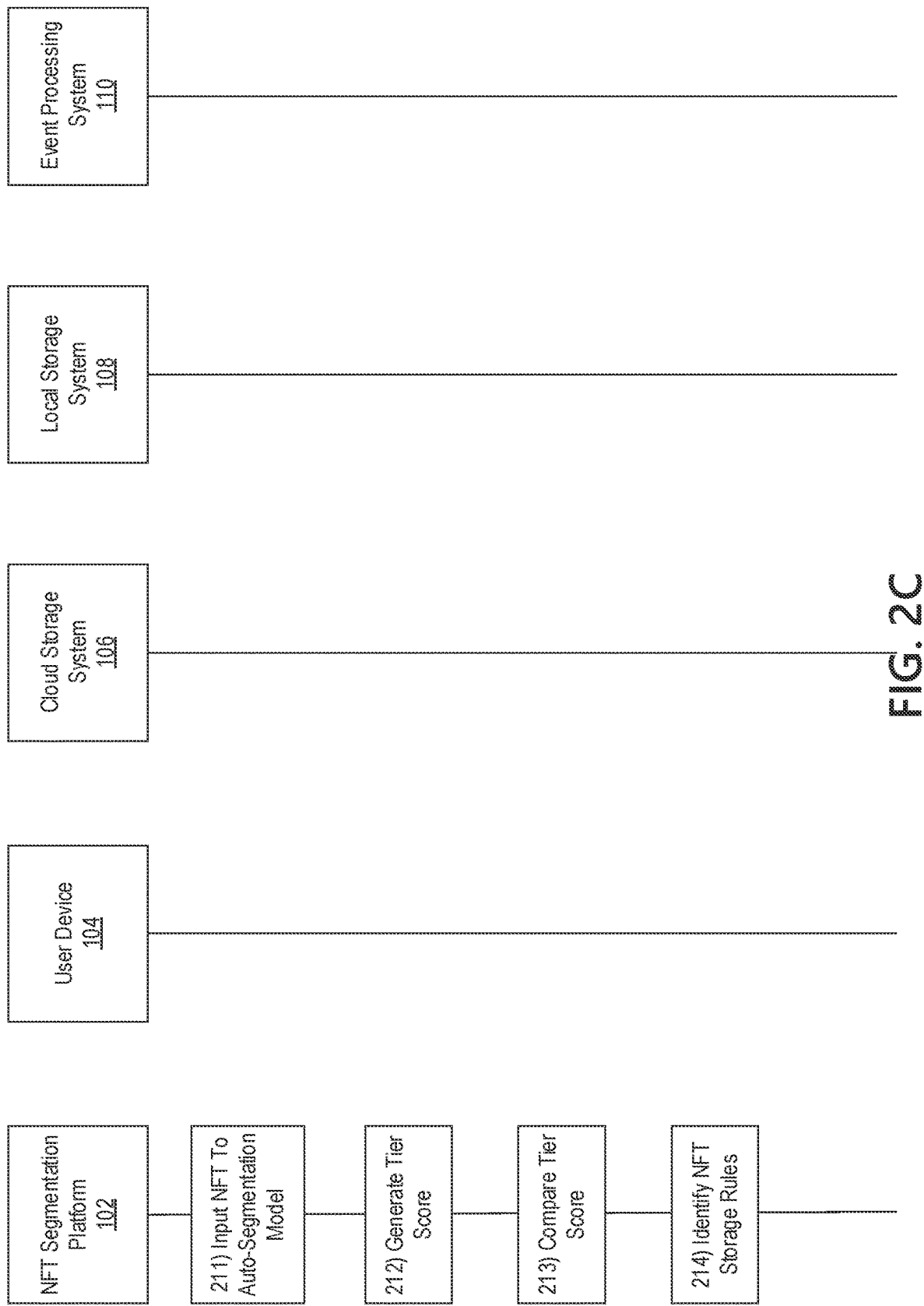

Referring to FIG. 2C, at step 211, the NFT segmentation platform 102 may input the NFT into the auto-segmentation model, which may, e.g., be configured to generate a tier score (e.g., a first tier score). In some instances, the tier score may be based wholly or in part on the approximate value of the NFT (e.g., current market value, purchase price, and/or other values). For example, inputting an NFT with a market value at or above a predetermined threshold may cause the auto-segmentation model to generate a tier score corresponding to a higher tier than the tier score generated in response to the input of an NFT with a market value below the predetermined threshold. Additionally or alternatively, the tier score may be based on information of the NFT (e.g., account information, transaction history, identity providers (IdPs), profile information, and/or other information). For example, inputting an NFT with account information corresponding to a long-standing account (e.g., a long-standing account managed by a financial institution (e.g., an account established and in good standing with the financial institution for at least a predetermined time period), and/or other institutions) may cause the auto-segmentation model to generate a tier score corresponding to a higher tier than the tier score generated in response to the input of an NFT with account information corresponding to a new account (e.g., a new account managed by a financial institution, and/or other institutions). Additionally or alternatively, other information (e.g., transaction value, current balance, transaction urgency, and/or other information may be used to output the tier score.

At step 212, the NFT segmentation platform 102 may generate the tier score using the auto-segmentation model. In generating the tier score, the auto-segmentation model may generate the tier score as an integer value, alphanumeric character, percentage value, decimal value, hexadecimal value, binary value, and/or other representations of the tier score. The auto-segmentation model may generate the tier score by comparing the NFT to the stored historical NFTs used to train the model, and identify the tier score based on the historical tier scores of the corresponding historical NFTs. For example, the auto-segmentation model may identify that a historical NFT within a same value range as the NFT corresponds to a particular tier score. Based on identifying that the historical NFT corresponds to the particular tier score and has an equivalent approximate value to the NFT, the auto-segmentation model may generate the same particular tier score for the NFT.

In some examples, the NFT segmentation platform 102 may have previously trained the auto-segmentation model to employ a tier score algorithm to determine the tier score. In some instances, the tier score algorithm may use some or all of the information included in the NFT, the historical NFTs, and the historical tier scores. For example, the NFT segmentation platform 102 may execute the tier score algorithm using the following constraints/parameters: If (NFT market value−Historical NFT market value)≥0, then NFT tier score-≥Historical NFT tier score. If (NFT market value−Historical NFT market value)<0, then NFT tier score=0.

At step 213, the NET segmentation platform 102 may compare the tier score to one or more tier thresholds. The tier thresholds may correspond to storage rules (e.g., directions to access storage systems, storage capacity limits, directions to store based on tier scores, and/or other rules). For example, a tier threshold may be or have an integer value of 5. The tier threshold may correspond to storage rules directing the NFT segmentation platform 102 to store NFTs having tier scores that do not meet or exceed the tier threshold to local storage. The tier threshold may further correspond to storage rules directing the NFT segmentation platform 102 to store NFTs having tier scores that meet or exceed the tier threshold to cloud storage. In comparing the tier score to the one or more tier thresholds, the NFT segmentation platform 102 may identify whether the tier score meets or exceeds the tier threshold. For example, a tier score may have or be a value of 6, while the tier threshold may be 5. The NFT segmentation platform 102 may then identify that the tier score exceeds the tier threshold.

At step 214, the NFT segmentation platform 102 may identify the NFT storage rules. In identifying the NFT storage rules, the NFT segmentation platform 102 may identify storage rules corresponding to the NFT based on whether or not the tier score meets or exceeds the tier threshold determined at step 213. For example, based on identifying that the tier score does not meet or exceed the tier threshold of 5, and that the tier threshold corresponds to storage rules directing the NFT segmentation platform 102 to store NFTs having tier scores that do not meet or exceed the tier threshold to local storage, the NFT segmentation platform 102 may identify that the NFT should be stored at a local storage system (e.g., local storage system 108 and/or other storage systems). Based on identifying that the tier score meets or exceeds the tier threshold, and that the tier threshold corresponds to storage rules directing the NFT segmentation platform 102 to store NFTs having tier scores that meet or exceed the tier threshold to cloud storage, the NFT segmentation platform 102 may identify that the NFT should be stored at a cloud storage system (e.g., cloud storage system 106 and/or other storage systems).

In some instances, based on or in response to identifying that the NFT should be stored at a cloud storage system, the NFT segmentation platform 102 might store the NFT at a cloud storage system (e.g., cloud storage system 106, as described below at steps 215-218). In some examples, based on identifying that the NFT should be stored at a local storage system at step 214, NFT segmentation platform 102 might store the NFT at a local storage system (e.g., local storage system 108, as described below at steps 219-222).

Figure 2D:
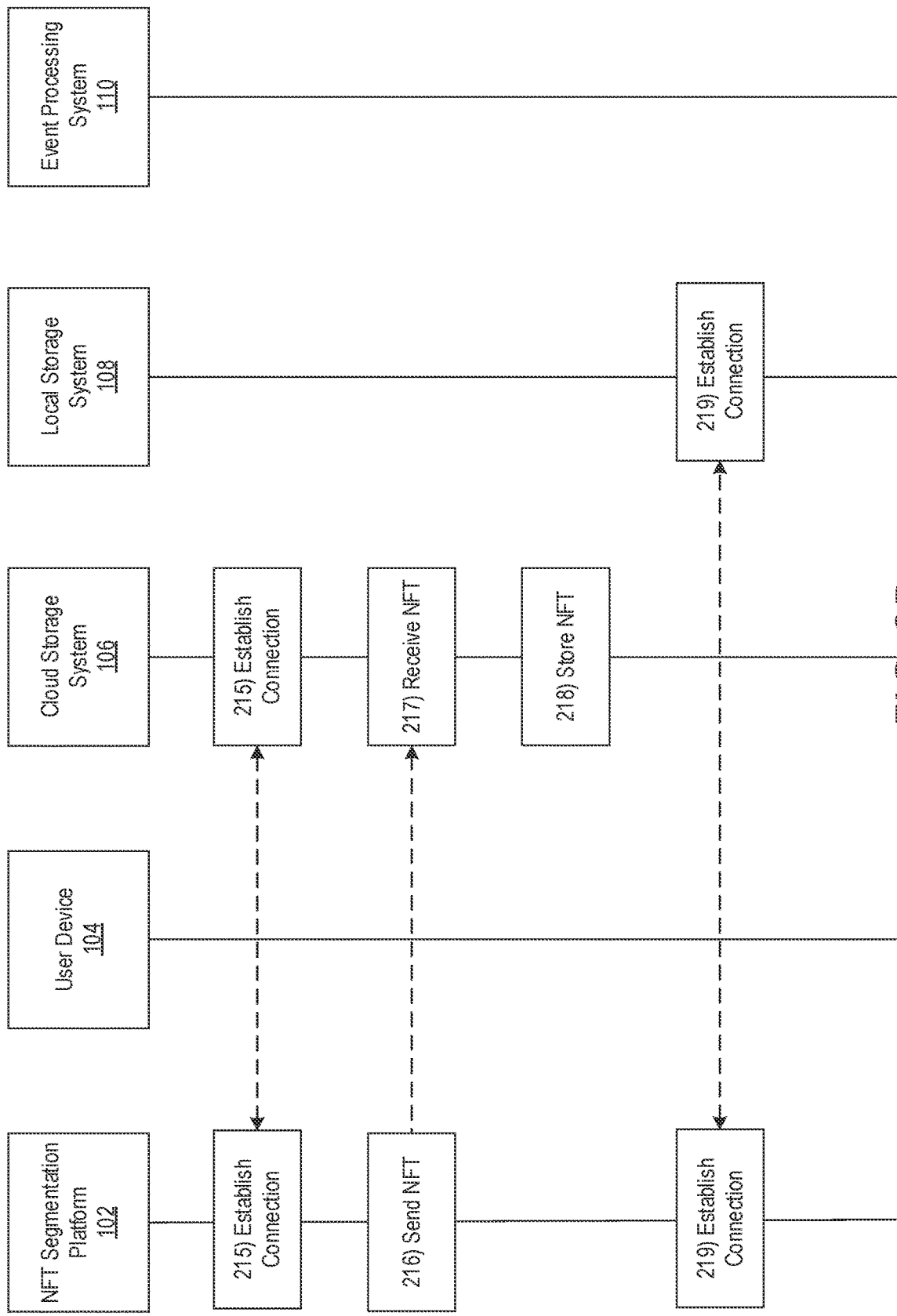

Referring to FIG. 2D, at step 215, NFT segmentation platform 102 may establish a connection with the cloud storage system 106. For example, NFT segmentation platform 102 may establish a second wireless data connection with the cloud storage system 106 to link the cloud storage system 106 with the NFT segmentation platform 102 (e.g., in preparation for sending the NFT). In some instances, the NFT segmentation platform 102 may identify whether or not a connection is already established with the cloud storage system 106. If a connection is already established with the cloud storage system 106, the NFT segmentation platform 102 might not re-establish the connection. If a connection is not yet established with the cloud storage system 106, the NFT segmentation platform 102 may establish the second wireless data connection as described above.

At step 216, NFT segmentation platform 102 may send the NFT to the cloud storage system 106. For example, the NFT segmentation platform 102 may send the NFT via the communication interface 113 and while the second wireless data connection is established. In some examples, the NFT segmentation platform 102 may additionally send the cloud storage system 106 one or more commands directing the cloud storage system 106 to store the NFT.

At step 217, the cloud storage system 106 may receive the NFT sent from the NFT segmentation platform 102. For example, the cloud storage system 106 may receive the NFT via the communication interface 113 and while the second wireless data connection is established. In some instances, the cloud storage system 106 may additionally receive the one or more commands directing the cloud storage system 106 to store the NFT.

At step 218, based on or in response to receiving the one or more commands directing the cloud storage system 106 to store the NFT, the cloud storage system 106 may store the NFT. The cloud storage system 106 may store the NFT in internal memory of the cloud storage system 106, and/or external memory. In some instances, cloud storage system 106 may store the NFT to a distributed ledger such as a blockchain, holo-chain, Merkle tree, and/or other distributed ledger hosted by the cloud storage system 106. For example, the cloud storage system 106 may create a new block or node of the distributed ledger (e.g., by modifying the distributed ledger), and may store the NFT in the new block accordingly.

At step 219, the NFT segmentation platform 102 may establish a connection with the local storage system 108. For example, NFT segmentation platform 102 may establish a third wireless data connection with the local storage system 108 to link the local storage system 108 with the NFT segmentation platform 102 (e.g., in preparation for sending the NFT). In some instances, the NFT segmentation platform 102 may identify whether or not a connection is already established with the local storage system 108. If a connection is already established with the local storage system 108, the NFT segmentation platform 102 might not re-establish the connection. If a connection is not yet established with the local storage system 108, the NFT segmentation platform 102 may establish the third wireless data connection as described above.

Figure 2E:
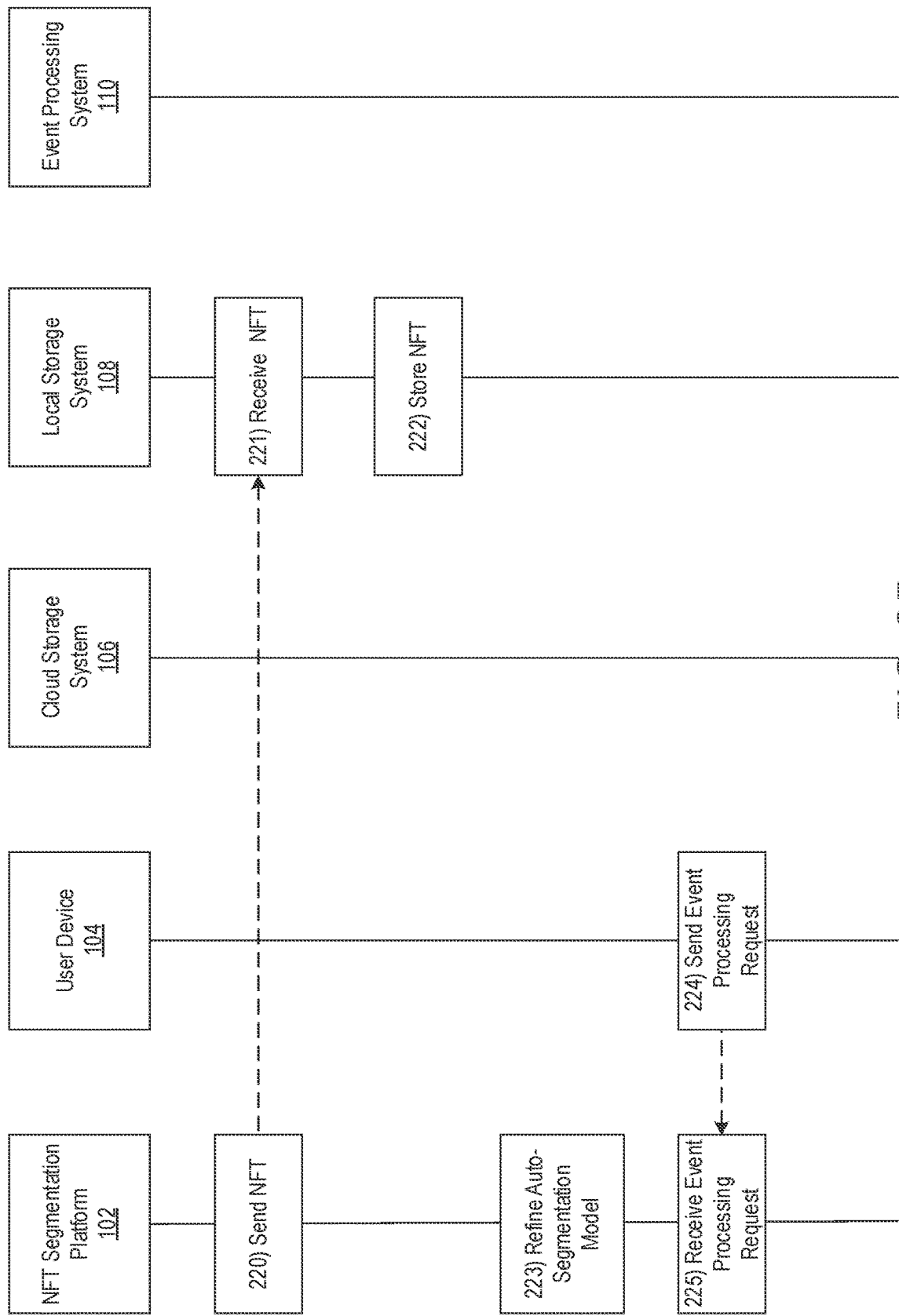

Referring to FIG. 2E, at step 220, NFT segmentation platform 102 may send the NFT to the local storage system 108. For example, the NFT segmentation platform 102 may send the NFT via the communication interface 113 and while the third wireless data connection is established. In some examples, the NFT segmentation platform 102 may additionally send the local storage system 108 one or more commands directing the local storage system 108 to store the NFT.

At step 221, the local storage system 108 may receive the NFT sent from the NFT segmentation platform 102. For example, the local storage system 108 may receive the NFT via the communication interface 113 and while the third wireless data connection is established. In some instances, the local storage system 108 may additionally receive the one or more commands directing the local storage system 108 to store the NFT.

At step 222, based on or in response to receiving the one or more commands directing the local storage system 108 to store the NFT, the local storage system 108 may store the NFT. The local storage system 108 may store the NFT in internal memory of the local storage system 108, and/or external memory.

It is noted that, as described above at step 214, in some instances, based on or in response to identifying that the NFT should be stored at a cloud storage system at step 214, the actions described above at steps 219-222 may not be performed. In some examples, based on identifying that the NFT should be stored at a local storage system at step 214, the actions described above at steps 215-218 may not be performed. In some examples, based on or in response to storing the NFT (e.g., at cloud storage system 106 and/or at local storage system 108) the NFT segmentation platform 102 may update and/or otherwise configure the user profile to include an NFT storage location corresponding to the NFT (e.g., at local storage system 108, at cloud storage system 106, and/or at other storage systems).

It is further noted that, in some examples, the auto-segmentation model may dynamically update the tier score based on changed conditions (e.g., changed network conditions, changed value of the NFT, changed ownership of the NFT, changed market conditions, and/or other changed conditions) and using the methods described above step 212. For example, the auto-segmentation model may change a first tier score to a second tier score based on the changed conditions. Based on detecting a change in the first tier score to the second tier score, the NFT segmentation platform 102 may modify the storage location of the NFT.

In these instances, the NFT segmentation platform 102 may repeat the methods described above at steps 213-214 using the second tier score to modify the storage location. For example, the NFT segmentation platform 102 may compare the second tier score to the tier threshold. Based on identifying that the second tier score meets or exceeds the tier threshold, and previously was less than the tier threshold, the NFT segmentation platform 102 may shift the NFT to cloud storage at a cloud computing platform (e.g., at cloud storage system 106). Based on identifying that the second tier is less than the tier threshold and previously met or exceeded the tier threshold, the NFT segmentation platform 102 may shift the NFT to local storage (e.g. at local storage system 108).

Referring back to FIG. 2E, at step 223, the NFT segmentation platform 102 may refine the auto-segmentation model based on the tier score and the NFT. In some instances, refining the auto-segmentation model may include inputting the NFT and the tier score into the auto-segmentation model. By inputting the tier score and the NFT into the auto-segmentation model, the NFT segmentation platform 102 may create an iterative feedback loop that may continuously and dynamically refine the auto-segmentation model to improve its accuracy. For example, NFT segmentation platform 102 may identify that the NFT received the tier score based on a particular value (e.g., a monetary value, and/or other value) corresponding to the NFT. In these instances, the NFT segmentation platform 102 may refine the auto-segmentation model to automatically generate, in future iterations of the feedback loop and for future NFTs corresponding to equivalent or greater values, a tier score equivalent to or greater than the tier score corresponding to the NFT. In doing so, the NFT segmentation platform 102 may improve accuracy and effectiveness of the tier score generation process by the auto-segmentation model, which may, e.g., result in more efficient training of models trained by the NFT segmentation platform 102 (and may in some instances, conserve computing and/or processing power/resources in doing so).

Additionally or alternatively, the NFT segmentation platform 102 may refine the auto-segmentation model by refining the tier thresholds used to generate the tier score. For example, the NFT segmentation platform 102 may monitor variables (e.g., storage capacities, latencies, delays, bandwidth, and/or other variables) to determine whether more or less NFTs should be sent to cloud storage system 106 or to local storage system 108. In these instances, the NFT segmentation platform 102 may adjust the tier thresholds accordingly. In doing so, the NFT segmentation platform 102 may minimize any delays in storing, processing, and/or retrieving NFTs from a cloud storage system while maximizing the number of users able to make use of the cloud storage system 106 (e.g., by optimizing the number of NFTs sent to the cloud storage system and the local storage system).

Additionally or alternatively, the NFT segmentation platform 102 may monitor the NFT and refine the auto-segmentation model to dynamically modify the tier score based on user interactions with the NFT. For example, an NFT may correspond to a particular tier score based on the status of a user of the NFT (e.g., priority customer status, preferred account status, and/or other status). In some instances, the user of the NFT may undergo a change in status. For example, the user of the NFT may not initially be a priority customer, but may become a priority customer. In these instances, the NFT segmentation platform 102 may train the auto-segmentation model to modify (e.g., increase or decrease) the tier score based on the change in status of the user of the NFT.

At step 224, the user device 104 may send an event processing request to NFT segmentation platform 102. For example, the user device 104 may send the event processing request via the communication interface 113 and while the first wireless data connection is established. In some instances, in sending the event processing request, the user device 104 may send transaction requests, NFT trade requests, payment processing requests, requests to evaluate an NFT, and/or other requests. In some instances, the event processing request may require the NFT segmentation platform 102 to access an NFT previously stored at cloud storage or local storage by the NFT segmentation platform, via steps 201-222 described above.

At step 225, the NFT segmentation platform 102 may receive the event processing request from user device 104. For example, the NFT segmentation platform 102 may receive the event processing request via the communication interface 113 and while the first wireless data connection is established.

Referring to FIG. 2F, at step 226, the NFT segmentation platform 102 may identify a storage location of the NFT based on the event processing request and the user profile. In identifying the storage location of the NFT, the NFT segmentation platform 102 may analyze the event processing request to identify that the NFT is included in, and/or necessary to, the event processing request. In these instances, the NFT may compare the NFT to the user profile in order to identify the NFT storage location. For example, the NFT segmentation platform 102 may search the user profile for information of the NFT, such as the storage location (e.g., cloud storage system 106, local storage system 108, and/or other storage systems) corresponding to the storage rules identified above at step 214.

At step 227, based on or in response to identifying the storage location of the NFT, the NFT segmentation platform may access the NFT. In some instances, in accessing the NFT, based on or in response to identifying cloud storage system 106 as the NFT storage location, the NFT segmentation platform 102 may retrieve the NFT from cloud storage system 106. For example, the NFT segmentation platform 102 may request access to the NFT from cloud storage system 106. Based on or in response to the request to access the NFT, cloud storage system 106 may grant NFT segmentation platform 102 access to the NFT. For example, cloud storage system 106 may send the NFT to NFT segmentation platform 102 via the communication interface 113 and while the second wireless data connection is established. In some examples, in accessing the NFT, based on or in response to identifying local storage system 108 as the NFT storage location, the NFT segmentation platform 102 may retrieve the NFT from local storage system 108. For example, the NFT segmentation platform 102 may request access to the NFT from local storage system 108. Based on or in response to the request to access the NFT, local storage system 108 may grant NFT segmentation platform 102 access to the NFT. For example, local storage system 108 may send the NFT to NFT segmentation platform 102 via the communication interface 113 and while the third wireless data connection is established.

At step 228, based on or in response to accessing the NFT, the NFT segmentation platform 102 may receive NFT information (e.g., account information, event processing information, owner information, market value information, user identifiers, social media information, authentication information, transaction history, geographical information and/or other information). In receiving the NFT information, the NFT segmentation platform 102 may analyze the NFT and/or the user profile to retrieve the NFT information required by the event processing request. For example, the NFT segmentation platform 102 may identify that the event processing request requires the exchange of the NFT for a second NFT corresponding to a second user. The NFT segmentation platform 102 may further identify that the exchange of the NFT for the second NFT requires owner information (e.g., the user's legal name) which may, for example, be required to confirm that the user legally owns and/or obtained the NFT, and market value information (e.g., current market value of the NFT) which may, for example, be required to confirm the NFT's market value is sufficient to complete the exchange.

Additionally or alternatively, in some instances the NFT segmentation platform 102 may receive the NFT information by requesting it from a third party (e.g., vendors, institutions, service providers, user devices, user profiles, and/or other third parties), such as by using an application programming interface (API) call. For example, the NFT segmentation platform 102 may use an API call to request NFT information (e.g., the market value of the NFT) from one or multiple vendors dealing with NFTs (e.g., an NFT marketplace, and/or other vendors). In these instances, based on or in response to receiving the API call from the NFT segmentation platform 102, the vendor or vendors may send the requested NFT information to the NFT segmentation platform 102. For example, the vendor or vendors may send the requested NFT information via a wireless data connection. In some instances, using an API call may improve accuracy by allowing the NFT segmentation platform 102 to continuously and dynamically check the market value and/or ownership of the NFT.

At step 229, the NFT segmentation platform 102 may input the NFT information into the NFT validation model in order to output an NFT validation rating corresponding to the NFT. The NFT validation rating may be generated based on factors such as changes in the value of the NFT, change in ownership of the NFT, and/or other factors. For example, an NFT that decreased in market value by twenty percent since it was stored by NFT segmentation platform 102 may produce a higher NFT validation rating than an NFT that increased in market value by twenty percent since it was stored by NFT segmentation platform 102. In some instances, the NFT validation rating may reflect the likelihood that the NFT will cause the event processing request to be rejected, canceled, and/or otherwise fail to execute (e.g., can no longer serve as adequate collateral for a loan, provide sufficient payment in a transaction, and/or otherwise).

In generating the NFT validation rating for output, the NFT validation model may generate the NFT validation rating as a numerical value range, an integer value, a decimal value, an alphanumeric representation, a percentage value, a hexadecimal value, a binary value, and/or other values. The NFT validation model may generate the NFT validation rating by comparing the NFT information to the stored historical NFT information used to train the model, and identify the NFT validation rating based on the historical NFT validation ratings included in the historical NFT information. For example, the NFT validation model may identify that a historical NFT validation rating was generated in response to historical NFT information of a twenty percent decrease in the market value of an NFT. Based on identifying that the historical NFT validation rating corresponds to the historical NFT information of a twenty percent decrease in the market value of an NFT, the NFT validation model may generate an NFT validation rating equivalent to the historical NFT validation rating in response to input of NFT information of a twenty percent decrease in the market value of the NFT.

Additionally or alternatively, in some examples the NFT validation rating may be generated based on indicators of unauthorized access to the NFT (e.g., identifying that the NFT information corresponds to a user different from the user corresponding to the event processing request, and/or other indicators). In these instances, the NFT validation model may compare some or all of the NFT information to identify discrepancies within the NFT information. For example, the NFT validation model may identify that the NFT corresponds to a first account (e.g., an electronic mail account linked to user device 104) based on ownership information, while the event processing request corresponds to a second account (e.g., a social media account) based on event processing information. Based on identifying a discrepancy within the NFT information, the NFT validation model may increase the NFT validation rating corresponding to the NFT. In generating the NFT validation rating based on indicators of unauthorized access to the NFT, the NFT segmentation platform 102 may provide increased security and risk management for users of NFT segmentation platform 102.

In some examples, the NFT segmentation platform 102 may have previously trained the NFT validation model to employ an NFT validation rating algorithm to determine the NFT validation rating. In some instances, the NFT validation rating algorithm may use some or all of the NFT information and some or all of the historical NFT information. For example, the NFT segmentation platform 102 may execute the following NFT validation rating algorithm: historical risk rating+(change in market value of NFT−change in market value of historical NFT)=risk rating.

In some examples, in employing the NFT validation rating algorithm, the NFT validation model may combine different portions of the NFT information (e.g., market value information and ownership information, and/or other information). For example, the NFT segmentation platform 102 may execute the following NFT validation rating algorithm:

$$\frac{\text{increase in } \mathit{NFT} \text{ market value}}{\text{number of previous owners of } \mathit{NFT}} = \text{risk rating}.$$

Figure 2G:
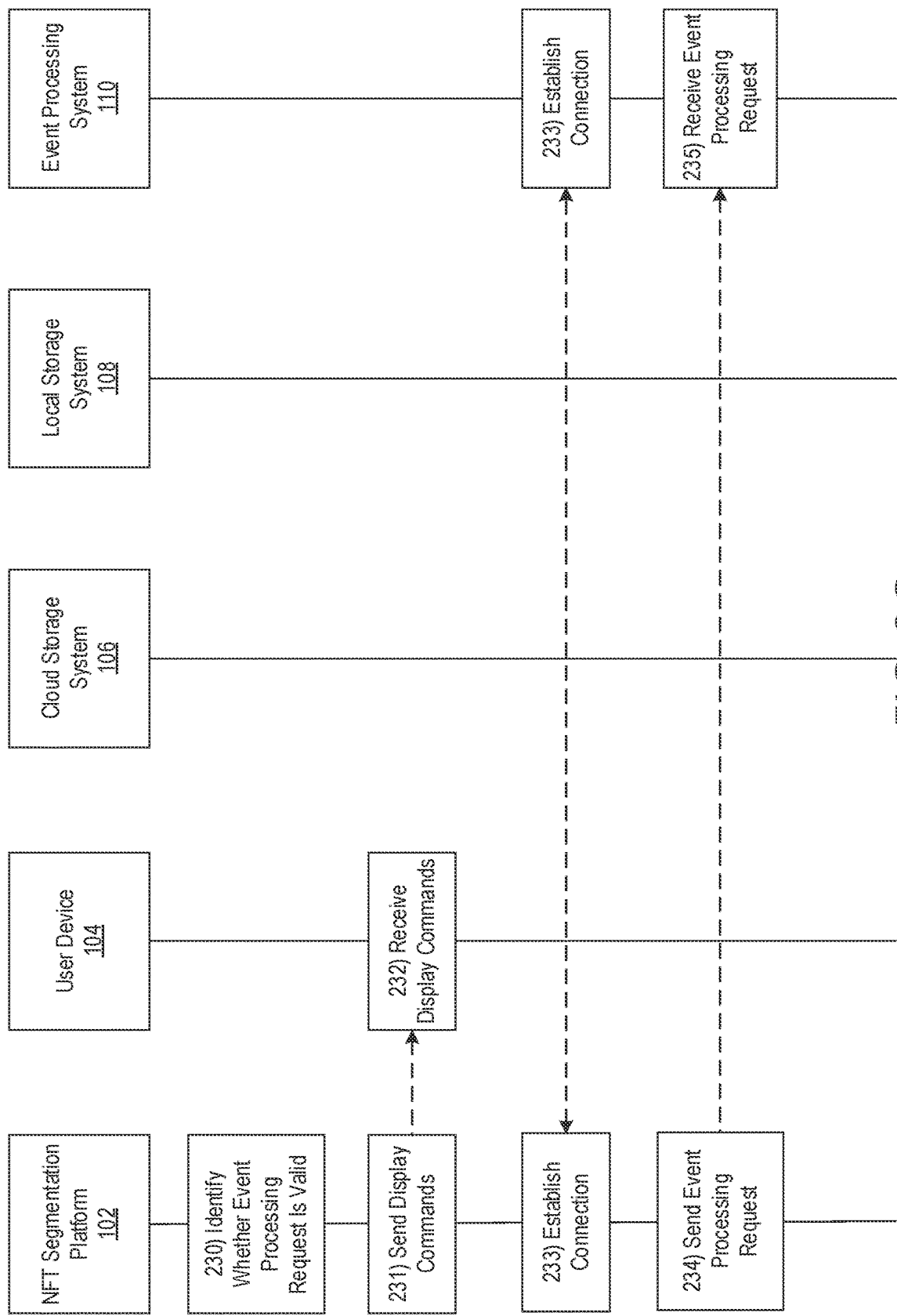

Referring to FIG. 2G, at step 230, the NFT segmentation platform 102 may identify whether or not the event processing request is valid. In identifying whether or not the event processing request is valid, the NFT segmentation platform 102 may compare the NFT validation rating corresponding to the NFT to a threshold value (e.g., an integer value, a decimal value, a percentage value, and/or other values). The threshold value may be supplied by the NFT information, the user (e.g., via user device 104), the event processing request, and/or other sources. In comparing the NFT validation rating to the threshold value, the NFT segmentation platform may determine whether the event processing request should be executed using the NFT. For example, based on identifying that the NFT validation rating meets or exceeds the threshold value, the NFT segmentation platform 102 may determine that the event processing request is not valid and should not be executed using the NFT. In other examples, based on identifying that the NFT validation rating does not exceed the threshold value, the NFT segmentation platform 102 may determine that the event processing request is valid and should be executed using the NFT.

Additionally or alternatively, in some instances the NFT segmentation platform 102 may execute an API call to retrieve social media information (e.g., social media profiles, linked accounts, usernames, and/or other information) from a social media account in order to identify whether or not the event processing request is valid. For example, the NFT segmentation platform 102 may execute an API call to retrieve the name associated with the social media profile corresponding to the user of user device 104. NFT segmentation platform 102 may identify that the name associated with the social media profile matches the name of the owner of the NFT. Based on identifying that the name associated with the social media profile matches the name of the owner of the NFT, the NFT segmentation platform 102 may update the NFT validation rating (e.g., by increasing the NFT validation rating). The NFT segmentation platform 102 may then compare the NFT validation rating to the threshold value and determine whether the event processing request is valid as described above.

At step 231, based on or in response to identifying that the event processing request is not valid, the NFT segmentation platform 102 may send one more commands directing the user device 104 to display a user interface to user device 104. For example, the NFT segmentation platform 102 may send the one or more commands directing the user device 104 to display a user interface via the communication interface 113 and while the first wireless data connection is established.

At step 232, the user device 104 may receive the one or more commands directing the user device 104 to display the user interface from NFT segmentation platform 102. For example, the user device 104 may receive the one or more commands directing the user device 104 to display the user interface via the communication interface 113 and while the first wireless data connection is established. Based on or in response to the one or more commands to display the user interface, the user device 104 may display an NFT risk interface.

Figure 3C:

For example, in displaying the NFT risk interface, the user device 104 may display a graphical user interface similar to NFT risk interface 320, which is illustrated in FIG. 3C. Referring to FIG. 3C, in some instances, the NET risk interface 320 may include information corresponding to the NFT validation rating, the event processing request, and/or other information. For example, the NET risk interface 320 may include information such as the result of NFT segmentation platform 102 identifying whether or not the event processing request was valid, the NFT validation rating, the threshold value, the cause of the failure to identify that the event processing request was valid, and/or other information.

Referring back to FIG. 2G, at step 233, based on or in response to identifying that the event processing request is valid, the NFT segmentation platform 102 may establish a connection with event processing system 110. For example, NFT segmentation platform 102 may establish a fourth wireless data connection with the event processing system 110 to link the NFT segmentation platform 102 with the event processing system 110 (e.g., in preparation for sending an event processing request). In some instances, the NFT segmentation platform 102 may identify whether or not a connection is already established with the event processing system 110. If a connection is already established with the event processing system 110, the NFT segmentation platform 102 might not re-establish the connection. If a connection is not yet established with the event processing system 110, NFT segmentation platform 102 may establish the fourth wireless data connection as described above.

At step 234, the NFT segmentation platform 102 may send an event processing request to event processing system 110. For example, the NFT segmentation platform 102 may send the event processing request via the communication interface 113 and while the fourth wireless data connection is established. In some instances, the NFT segmentation platform 102 may send an event processing request received from the user device 104 at step 225. In some instances, the NFT segmentation platform 102 may additionally send one or more commands directing the event processing system 110 to process the event.

At step 235, the event processing system 110 may receive the event processing request from NFT segmentation platform 102. For example, the event processing system 110 may receive the event processing request via the communication interface 113 and while the fourth wireless data connection is established. In some instances, the event processing system 110 may additionally receive the one or more commands directing the event processing system 110 to process the event.

Figure 2H:
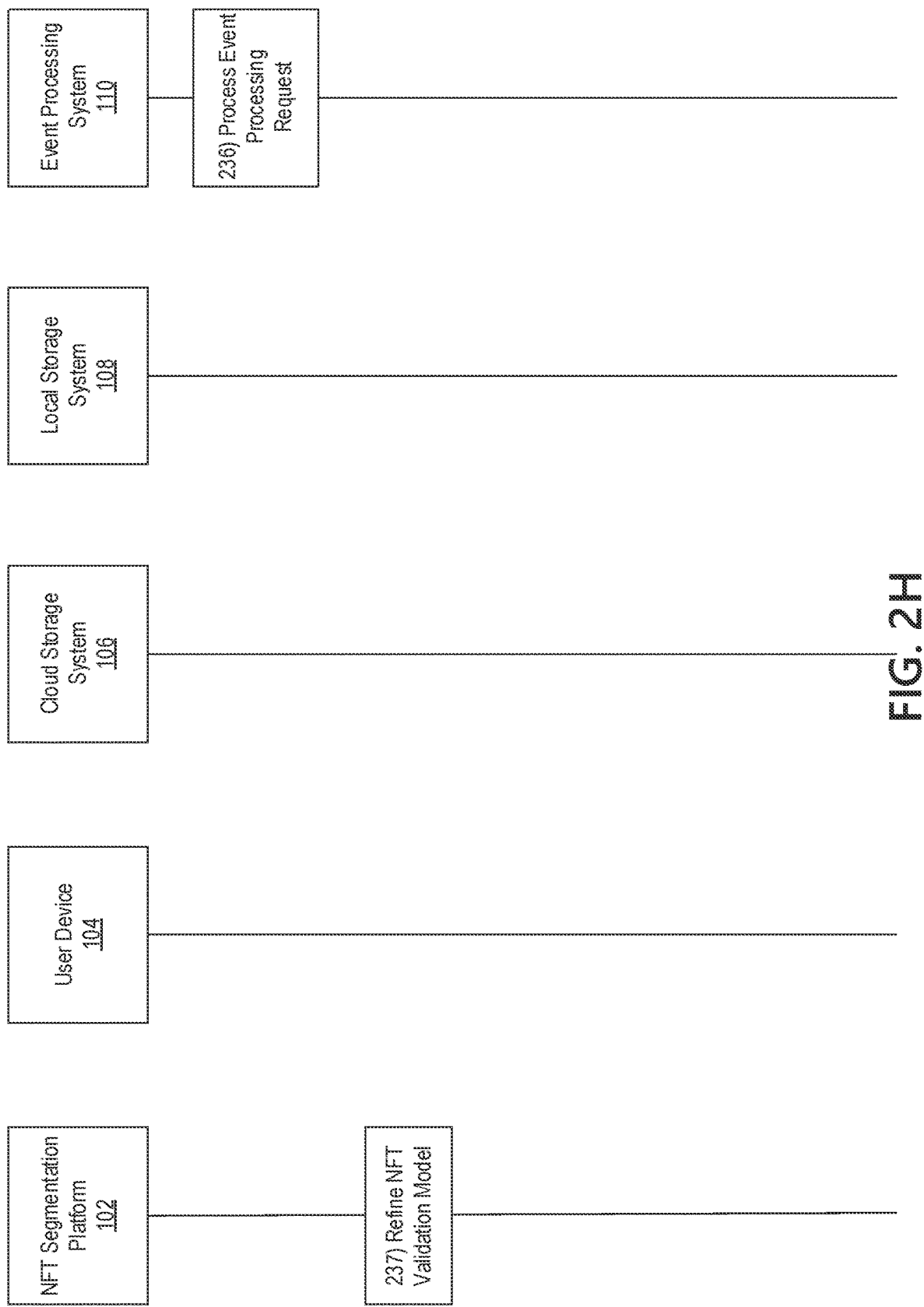

Referring to FIG. 2H, at step 236, the event processing system 110 may process the event processing request. In some examples, the event processing system 110 may process the event processing request based on or in response to the one or more commands directing the event processing system 110 to process the event received at step 234. For example, the event processing system 110 may cause an exchange of NFTs to be completed between two accounts (e.g., bank accounts, such as those managed by a financial institution), process a payment using the NFT, transfer the NFT, and/or execute other tasks/events.

It is noted that, in some instances, based on identifying that the event processing request is not valid at step 230, the actions described above at steps 233-236 may not be performed. In some examples, based on identifying that the event processing request is valid at step 230, the actions described above at steps 231-232 may not be performed.

At step 237, the NFT segmentation platform 102 may refine the NFT validation model based on the remediation actions and user implementation input. In some instances, refining the NFT validation model may include inputting the NFT validation rating corresponding to the NFT and the NFT information into the NFT validation model. By inputting the NFT validation rating corresponding to the NFT and the NFT information into the NFT validation model, the NFT segmentation platform 102 may create an iterative feedback loop that may continuously and dynamically refine the NFT validation model to improve its accuracy. For example, NFT segmentation platform 102 may identify that a particular subset (e.g., an increase in the market value of the NFT) of the NFT information modified the NFT validation rating by a particular amount. In these instances, the NFT segmentation platform 102 may refine the NFT validation model to automatically modify the NFT validation rating by the particular amount when the particular subset of the NFT information is received by the NFT segmentation platform 102 in future iterations of the feedback loop. In doing so, the NFT segmentation platform 102 may improve accuracy and effectiveness of the NFT validation rating generation process by the machine learning model, which may, e.g., result in more efficient training of models trained by the NFT segmentation platform 102 (and may in some instances, conserve computing and/or processing power/resources in doing so).

Figure 4A:
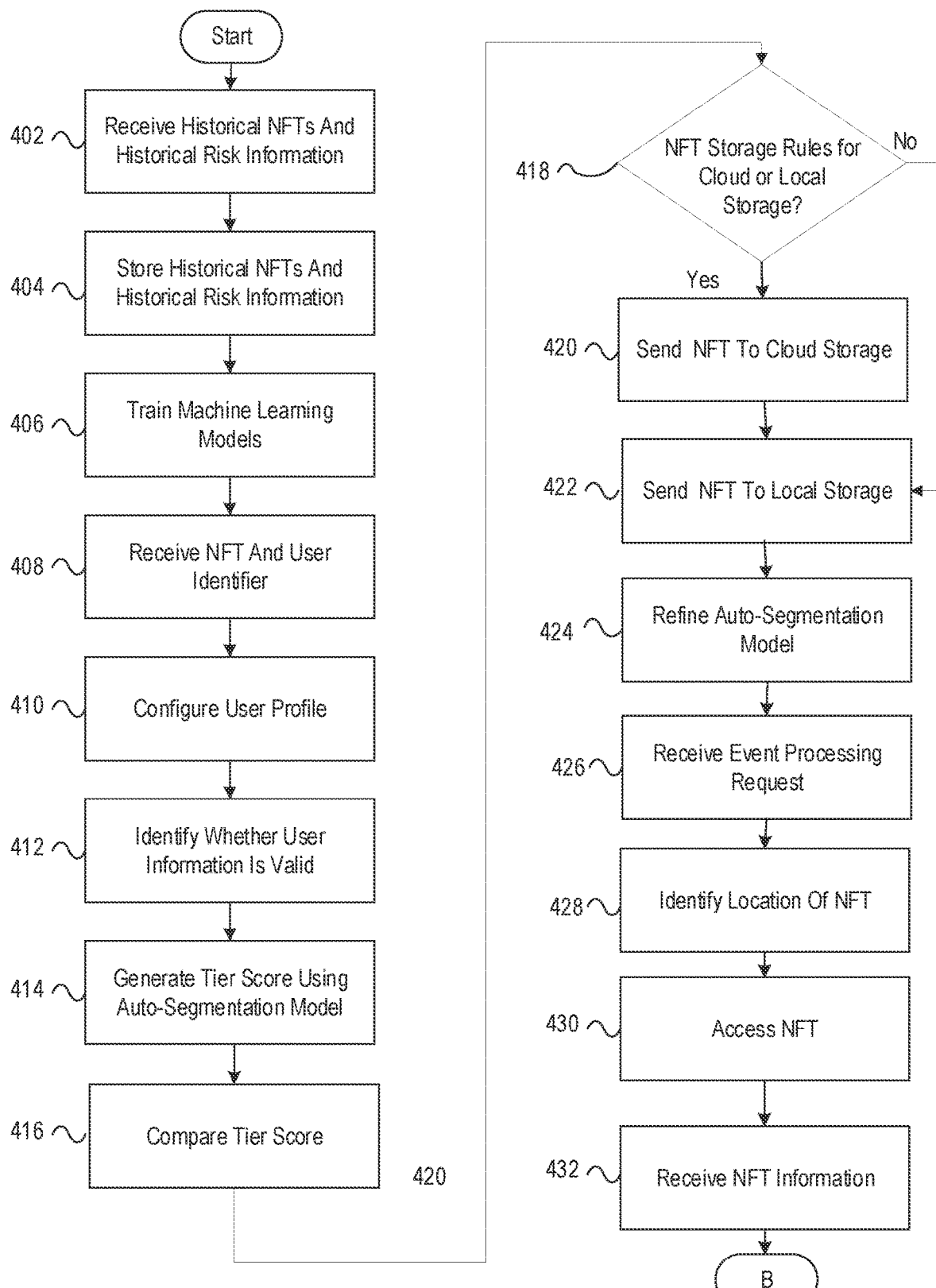
FIGS. 4A-4B depict illustrative methods for auto-segmentation of NFTs using a machine learning model in accordance with one or more example embodiments.
Figure 4B:
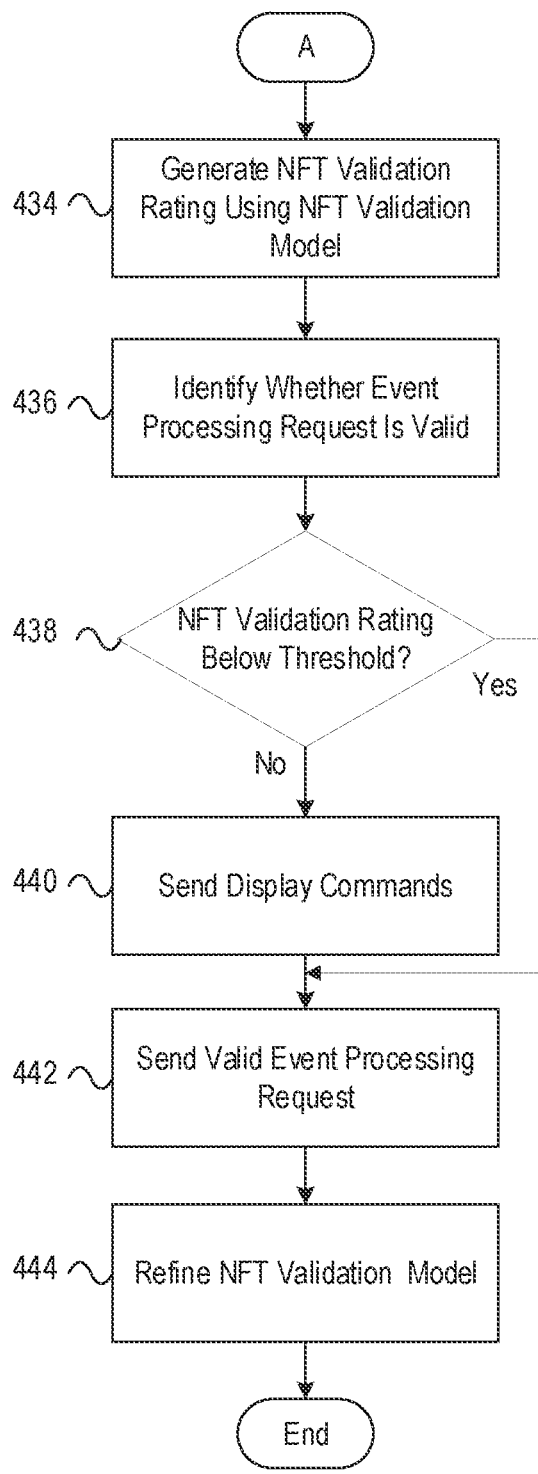

FIGS. 4A and 4B depict an illustrative method for auto-segmentation of NFTs using a machine learning model in accordance with one or more example embodiments. Referring to FIG. 4A, at step 402, a computing platform having at least one processor, a communication interface, and memory may receive historical NFTs and historical risk information. At step 404, the computing platform may store the historical NFTs and the historical risk information. At step 406, the computing platform may train one or more machine learning models. For example, the computing platform may train an auto-segmentation model and an NFT validation model. At step 408, the computing platform may receive an NFT and a user identifier. At step 410, the computing platform may configure a user profile. At step 412, the computing platform may identify whether or not user information is valid (e.g., by comparing user information to the user profile). At step 414, the computing platform may generate a tier score corresponding to the NFT using the auto-segmentation model. At step 416, the computing platform may compare the tier score to one or more tier thresholds. At step 418, the computing platform may identify whether the NFT storage rules correspond to cloud storage or local storage. Based on identifying that the NFT storage rules correspond to local storage, the method may progress to step 422. Based on identifying that the NFT storage rules correspond to cloud storage, the method may progress to step 420.

At step 420, the computing platform may send the NFT to cloud storage. At step 422, the computing platform may send the NFT to local storage. At step 424, the computing platform may refine the auto-segmentation model based on the tier score and the NFT. At step 426, the computing platform may receive an event processing request. At step 428, the computing platform may identify the location of the NFT. At step 430, the computing platform may access the NFT. At step 432, the computing platform may receive NFT information corresponding to the NFT.

Referring to FIG. 4B, at step 434, the computing platform may generate an NFT validation rating corresponding to the NFT using the NFT validation model. At step 436, the computing platform may identify whether the event processing request is valid. At step 438, the computing platform may identify whether or not the NFT validation rating is below a threshold value. Based on identifying that the NFT validation rating is below the threshold value, the method may progress to step 442. Based on identifying that the NFT validation rating meets or exceeds the threshold value, the method may progress to step 440. At step 440, the computing platform may send display commands to a user device. At step 442, the computing platform may send the valid event processing request to an event processing system. At step 444, the computing platform may refine the NFT validation model based on the NET validation rating and the NFT information.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   train, based on historical non-fungible tokens (NFTs) and historical tier scores, an auto-segmentation model, wherein training the auto-segmentation model configures the auto-segmentation model to output tier scores corresponding to NFTs;
   train, based on historical NFT information corresponding to the historical NFTs, an NFT validation model, wherein training the NFT validation model configures the NFT validation model to output NFT validation ratings corresponding to NFTs;
   input a first NFT and user information into the auto-segmentation model to generate a first tier score corresponding to the first NFT, wherein the user information comprises one or more of: account information, value of the first NFT, network conditions, geographical information, or ownership history;
   compare the first tier score to a tier threshold in order to identify storage rules, wherein the storage rules direct the computing platform to:
      based on identifying that the first tier score meets or exceeds the tier threshold, store, by adding a new entry to a distributed ledger, the first NFT at a cloud computing platform comprising the distributed ledger; and
      based on identifying that the first tier score is less than the tier threshold, store the first NFT in a local storage system;
   modify, based on detecting a change in the first tier score to a second tier score, a storage location of the first NFT, wherein modifying the storage location of the first NFT comprises:
      comparing the second tier score to the tier threshold;
      based on identifying that the second tier score meets or exceeds the tier threshold and previously was less than the tier threshold, shifting, the first NFT to the cloud computing platform; and
      based on identifying that the second tier score is less than the tier threshold and previously met or exceeded the tier threshold, shifting, the first NFT to the local storage system;
   generate, using the NFT validation model and based on the first NFT, an NFT validation rating for the first NFT;
   filter, based on the NFT validation rating and during the modifying the storage location of the first NFT, one or more event processing requests corresponding to the first NFT;
   refine, based on the NFT validation rating and the NFT information, the NFT validation model; and
   refine the auto-segmentation model based on the first tier score, the second tier score, and the first NFT.

2. The computing platform of claim 1, wherein the memory stores additional computer-readable instructions that, when executed by the at least one processor, cause the computing platform to:
   identify, based on an event processing request and a user profile, a storage location of the first NFT;
   access the first NFT from the storage location;
   receive, based on the first NFT, the NFT information corresponding to the first NFT,
   wherein generating the NFT validation rating comprises inputting the NFT information into the NFT validation model;
   identify whether or not the event processing request is valid, wherein attempting to identify whether or not the event processing request is valid comprises comparing the NFT validation rating to a threshold value; and
   send, based on identifying that the event processing request is valid, the event processing request to an event processing system.

3. The computing platform of claim 2, wherein identifying whether or not the event processing request is valid further comprises:
   executing an application programming interface call to retrieve social media information from a social media account;
   receiving, from the social media account, the social media information;
   updating, based on the social media information, the NFT validation rating; and
   comparing the updated NFT validation rating to a threshold value.

4. The computing platform of claim 2, wherein the memory stores additional computer-readable instructions that, when executed by the at least one processor, cause the computing platform to:
   send, to a user device, one or more commands to display a user interface, wherein the one or more commands to display the user interface cause the user device to display the user interface; and
   request, via the user interface and based on identifying that the event processing request is invalid, from a user of the user device, validation information corresponding to the event processing request.

5. The computing platform of claim 2, wherein the NFT validation rating comprises one or more of: a numerical value range, integer values, alphanumeric characters, percentage values, decimal values, hexadecimal values, or binary values.

6. The computing platform of claim 2, wherein identifying the storage location of the first NFT comprises:
   analyzing the event processing request to identify the first NFT;
   identifying, based on the storage rules, a storage system where the first NFT is stored; and
   accessing the storage system.

7. The computing platform of claim 1, wherein the NFT information comprises one or more of:
   account information, event processing information, owner information, market value information, user identifiers, social media information, authentication information, transaction history, or geographical information.

8. The computing platform of claim 1, wherein the historical NFT information comprises one or more of:

account information, user identifiers, social media information, authentication information, transaction history, or geographical information; and different historical tier scores corresponding to a single NFT, wherein the different historical tier scores correspond to one or more of: an event processing request, an owner of the single NFT, current value of the single NFT, or market value information.

9. The computing platform of claim 1, wherein the new entry is indicative of a storage location of the first NFT.

10. The computing platform of claim 1, wherein the change in the first tier score is based on one or more of: changed network conditions, changed value of the first NFT, changed NFT ownership, or changed market conditions.

11. The computing platform of claim 1, wherein the memory stores additional computer-readable instructions that, when executed by the at least one processor, cause the computing platform to:

send, based on identifying that the user information is invalid, one or more commands to display a user interface to a user device.

12. The computing platform of claim 1, wherein the memory stores additional computer-readable instructions that, when executed by the at least one processor, cause the computing platform to:

configure, based on the historical NFTs, a user profile; and link the user profile to the first NFT.

13. The computing platform of claim 12, wherein the memory stores additional computer-readable instructions that, when executed by the at least one processor, cause the computing platform to:

identify, based on the user profile, whether or not user information is valid, wherein the user information comprises the first NFT and a user identifier corresponding to the first NFT.

14. The computing platform of claim 13, wherein the user identifier comprises one or more of:

account information, digital keys, digital flags, or profile information.

15. The computing platform of claim 1, wherein the first NFT comprises one or more of: digital signatures, digital assets, domain names, digital artwork, account information, transaction information, or digital currency.

16. The computing platform of claim 1, wherein generating the first tier score comprises the auto-segmentation model analyzing one or more of:

user information, account information, identity providers (IdPs), transaction history, or profile information.

17. The computing platform of claim 1, the storage rules comprise one or more of:

directions to access storage systems, storage capacity limits, or directions to store based on tier scores.

18. The computing platform of claim 1, wherein the first tier score comprises one or more of: integer values, alphanumeric characters, percentage values, decimal values, hexadecimal values, or binary values.

19. A method comprising:

at a computing platform comprising at least one processor, a communication interface, and memory:

training, based on historical non-fungible tokens (NFTs) and historical tier scores, an auto-segmentation model, wherein training the auto-segmentation model configures the auto-segmentation model to output of tier scores corresponding to NFTs;

training, based on historical NFT information corresponding to the historical NFTs, an NFT validation model, wherein training the NFT validation model configures the NFT validation model to output NFT validation ratings corresponding to NFTs;

inputting a first NFT and user information into the auto-segmentation model to generate a first tier score corresponding to the first NFT, wherein the user information comprises one or more of: account information, value of the first NFT, network conditions, geographical information, or ownership history;

comparing the first tier score to a tier threshold;

based on identifying that the first tier score meets or exceeds the tier threshold, storing, by adding a new entry to a distributed ledger, the first NFT at a cloud computing platform comprising the distributed ledger;

based on identifying that the first tier score is less than the tier threshold, storing the first NFT in a local storage system;

modifying, based on detecting a change in the first tier score to a second tier score, a storage location of the first NFT, wherein modifying the storage location of the first NFT comprises:

comparing the second tier score to the tier threshold;

based on identifying that the second tier score meets or exceeds the tier threshold and previously was less than the tier threshold, shifting, the first NFT to the cloud computing platform; and based on identifying that the second tier score is less than the tier threshold and previously met or exceeded the tier threshold, shifting, the first NFT to the local storage system;

generating, using the NFT validation model and based on the first NFT, an NFT validation rating for the first NFT;

filtering, based on the NFT validation rating and during the modifying the storage location of the first NFT, one or more event processing requests corresponding to the first NFT;

refining, based on the NFT validation rating and the NFT information, the NFT validation model; and refining the auto-segmentation model based on the first tier score, the second tier score, and the first NFT.

20. One or more non-transitory computer-readable media storing instructions that, when executed by a computing platform comprising at least one processor, a communication interface, and memory, cause the computing platform to:

train, based on historical non-fungible tokens (NFTs) and historical tier scores, an auto-segmentation model, wherein training the auto-segmentation model configures the auto-segmentation model to output tier scores corresponding to NFTs;

train, based on historical NFT information corresponding to the historical NFTs, an NFT validation model, wherein training the NFT validation model configures the NFT validation model to output NFT validation ratings corresponding to NFTs;

input a first NFT and user information into the auto-segmentation model to generate a first tier score corresponding to the first NFT, wherein the user information comprises one or more of: account information, value of the first NFT, network conditions, geographical information, or ownership history;

compare the first tier score to a tier threshold in order to identify storage rules, wherein the storage rules direct the computing platform to:

based on identifying that the first tier score meets or exceeds the tier threshold, store, by adding a new entry to a distributed ledger, the first NFT at a cloud computing platform comprising the distributed ledger;

based on identifying that the first tier score is less than the tier threshold, store the first NFT in a local storage system;

modify, based on detecting a change in the first tier score to a second tier score, a storage location of the first NFT, wherein modifying the storage location of the first NFT comprises:
  comparing the second tier score to the tier threshold;
  based on identifying that the second tier score meets or exceeds the tier threshold and previously was less than the tier threshold, shifting, the first NFT to the cloud computing platform; and
  based on identifying that the second tier score is less than the tier threshold and previously met or exceeded the tier threshold, shifting, the first NFT to the local storage system;
generate, using the NFT validation model and based on the first NFT, an NFT validation rating for the first NFT;
filter, based on the NFT validation rating and during the modifying the storage location of the first NFT, one or more event processing requests corresponding to the first NFT;
refine, based on the NET validation rating and the NFT information, the NFT validation model; and
refine the auto-segmentation model based on the first tier score, the second tier score, and the first NFT.

* * * * *